(12) United States Patent (10) Patent No.: US 8,797,619 B2
Kido et al. (45) Date of Patent: Aug. 5, 2014

(54) IMAGE PROCESSING APPARATUS AND IMAGE PROCESSING METHOD WITH EDITING

(75) Inventors: Hideyuki Kido, Isehara (JP); Hirokazu Ishii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1040 days.

(21) Appl. No.: 12/536,953

(22) Filed: Aug. 6, 2009

(65) Prior Publication Data

US 2010/0033741 A1 Feb. 11, 2010

(30) Foreign Application Priority Data

Aug. 8, 2008 (JP) ................................. 2008-205615

(51) Int. Cl.
*H04N 1/46* (2006.01)
*H04N 1/387* (2006.01)
*G06K 15/00* (2006.01)
*G06K 9/36* (2006.01)

(52) U.S. Cl.
USPC ............ 358/540; 358/1.9; 358/2.1; 358/1.18; 382/283; 382/284

(58) Field of Classification Search
None
See application file for complete search history.

(56) References Cited

U.S. PATENT DOCUMENTS

| | | | | |
|---|---|---|---|---|
| 5,199,081 | A * | 3/1993 | Saito et al. ..................... | 382/116 |
| 6,356,339 | B1 * | 3/2002 | Enomoto ........................ | 355/40 |
| 2002/0102022 | A1 * | 8/2002 | Ma et al. ........................ | 382/170 |
| 2005/0018926 | A1 * | 1/2005 | Momose et al. ............... | 382/284 |
| 2005/0088698 | A1 * | 4/2005 | Matama ......................... | 358/2.1 |
| 2005/0213174 | A1 | 9/2005 | Maki et al. | |
| 2005/0237578 | A1 * | 10/2005 | Ikeda et al. ................... | 358/302 |
| 2006/0170968 | A1 * | 8/2006 | Maki et al. ................... | 358/1.15 |
| 2007/0076980 | A1 * | 4/2007 | Maeda et al. ................. | 382/284 |
| 2009/0303544 | A1 * | 12/2009 | Kido ............................. | 358/1.18 |
| 2012/0114244 | A1 * | 5/2012 | Fujiwara ....................... | 382/186 |

FOREIGN PATENT DOCUMENTS

JP 2000-295565 A 10/2000

* cited by examiner

*Primary Examiner* — Vincent Rudolph
(74) *Attorney, Agent, or Firm* — Canon U.S.A., Inc., IP Division

(57) ABSTRACT

An image processing apparatus combines a background image, handwritten image, and a standard image. A reference image acquired by increasing the luminance value of the background image and the standard image is printed on a recording sheet. A recording sheet is read after being filled in, and a region whose luminance value is lower than a predetermined threshold value and a region indicated by standard image mask data are extracted. The extracted regions are combined with the background image and printed. In particular, the standard image mask data indicates a region in the standard image which is easily affected by a background color of a paper, so that color adjustment is performed on the region in the extracted image which is indicated by the mask data. As a result, the region in the standard image is prevented from being affected by the background color of the recording sheet in the combined result, and the images can be combined and printed according to the original color of the standard image.

20 Claims, 24 Drawing Sheets

FIG.9
PRINT EXAMPLE OF COMBINED
IMAGE IN FULL-PAGE LAYOUT
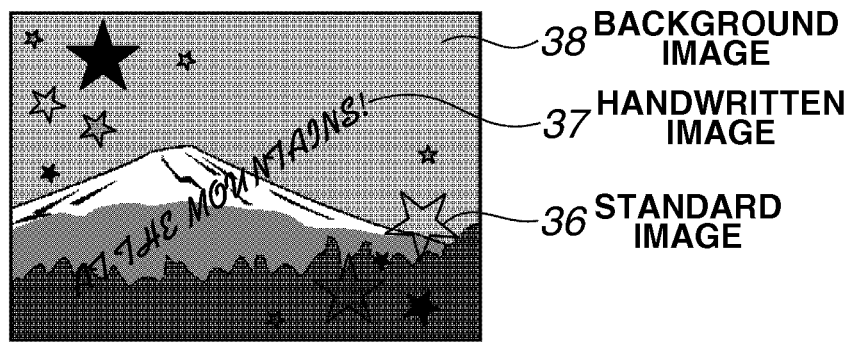
- 38 BACKGROUND IMAGE
- 37 HANDWRITTEN IMAGE
- 36 STANDARD IMAGE
PRINT EXAMPLE OF
COMBINED IMAGE IN
HALF-PAGE LAYOUT
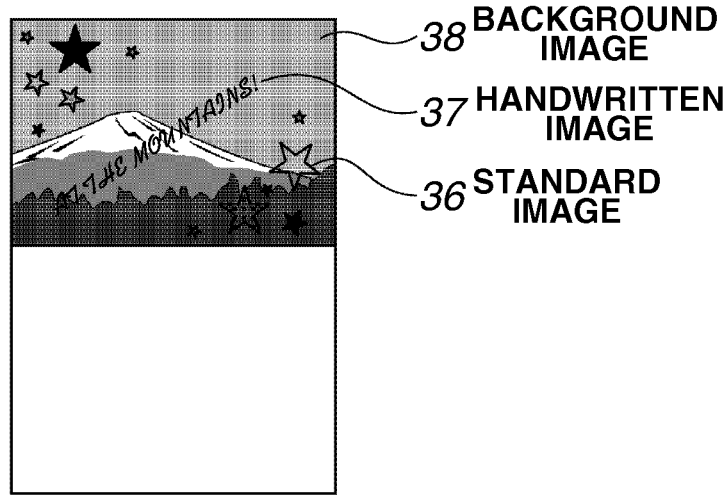
- 38 BACKGROUND IMAGE
- 37 HANDWRITTEN IMAGE
- 36 STANDARD IMAGE

LUMINANCE HISTOGRAM OF HANDWRITTEN REGION IMAGE 40

LUMINANCE HISTOGRAM OF EXTRACTED IMAGE 41

PRINT EXAMPLE OF
COMBINED IMAGE IN
HALF-PAGE LAYOUT

38 BACKGROUND IMAGE
37 HANDWRITTEN IMAGE
36 STANDARD IMAGE

IMAGE PROCESSING APPARATUS AND IMAGE PROCESSING METHOD WITH EDITING

BACKGROUND OF THE INVENTION

1. Field of the Invention

The present invention relates to image combining method for combining background image, handwritten image, and standard image.

2. Description of the Related Art

Recently, a wide-spread use and high performance of digital cameras, scanners, and printers has led to various usages of photo images other than simply printing the digital photo image on a recording sheet.

For example, there are techniques of adding handwritten characters and pictures on the photo image and combining standard digital image data such as an illustration to the photo image. A user can use such techniques to create a postcard by writing a message on the photo image captured by the digital camera and combining the photo image with a decoration frame.

There are several methods for combining handwritten characters and pictures or a standard image with the photo image input from an image input device such as the digital camera or the scanner.

U.S. Patent Application Publication No. US 2005/0213174 discusses printing a document sheet in which an input photo image is combined with the standard image. The user then writes characters and pictures in a handwritten region of the printed document sheet. The document sheet is read, and the handwritten image is superposed on and combined with the photo image. Further, the photo image is printed in the handwritten region of the document sheet, so that the user can recognize the position on the photo image at which the handwritten characters and pictures will be superposed and combined.

When the document sheet generated by the above-described method is read, it becomes necessary to distinguish the printed background image from the handwritten region and extract the handwritten characters and pictures. U.S. Patent Application Publication No. US 2005/0213174 discusses a technique for lightly printing the background image on the document sheet. When reading the document sheet, a threshold value is set as to the luminance, and the portion of the read image whose luminance value is lower than the threshold value is determined to be the portion handwritten by the user.

Moreover, Japanese Patent Application Laid-Open No. 2000-295565) discusses a method for combining the standard image with the photo image. A frame image recorded on a recording medium such as a memory card is read out and combined with the photo image. The photo image is then decorated and printed.

The above-described techniques can be used to combine the standard image with the photo image, and further with the image handwritten by the user. In such a case, the standard image and the lightly printed background image (hereinafter referred to as a reference image) are superposed on the handwritten region of the document sheet and printed. The user can thus write the characters or pictures while confirming the combined result. When such a document sheet is read, the printed standard image is distinguished from the reference image and extracted, similarly as the handwritten image. The standard image is then combined with the background image and printed.

However, when the standard image is printed in the handwritten region, read, and extracted from read image as described above, the extracted image may become affected by the background color of the document sheet. In particular, a white portion or a light color region in the extracted image may become affected by the background color and thus become different from the colors in the original standard image data. Since the extracted image is to be combined with the background image, the color tone of the standard image in the combined result may become different from the color tone of the standard image data. Further, color characteristics of a printing process and a reading process may further change the color tone of the standard image, so that the combined result may become unnatural.

SUMMARY OF THE INVENTION

The present invention is directed to an image processing apparatus in which, when the background image, the handwritten image, and the standard image are combined, the color tone of the standard image shows the color tone of the original image data.

According to an aspect of the present invention, an image processing apparatus includes a printing unit configured to print an image on a recording sheet, a reading unit configured to read the recording sheet, a conversion unit configured to convert a background image to a reference image which indicates the background image having a higher luminance than the background image, a first print control unit configured to cause the printing unit to print as a region to be written in by a user a first image in which a standard image is superposed on and combined with the reference image acquired by the conversion unit, an extraction unit configured to extract an image of a region having a lower luminance value than a predetermined value from a second image acquired by the reading unit reading the write-in region of the recording sheet written in, an acquisition unit configured to acquire mask data for extracting an image of a region corresponding to the standard image and indicating a color adjustment region of the extracted image, and a second print control unit configured to cause the printing unit to print on the recording sheet an image extracted from the second image using mask data acquired by the acquisition unit and the extraction unit, and superposed on and combined with the background image, in which a pixel of a color adjustment region indicated by the mask data is replaced by a predetermined pixel.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 illustrates examples of print results of the combined image.

DETAILED DESCRIPTION OF THE EMBODIMENTS

Various exemplary embodiments, features, and aspects of the invention will be described in detail below with reference to the drawings.

Figure 1:
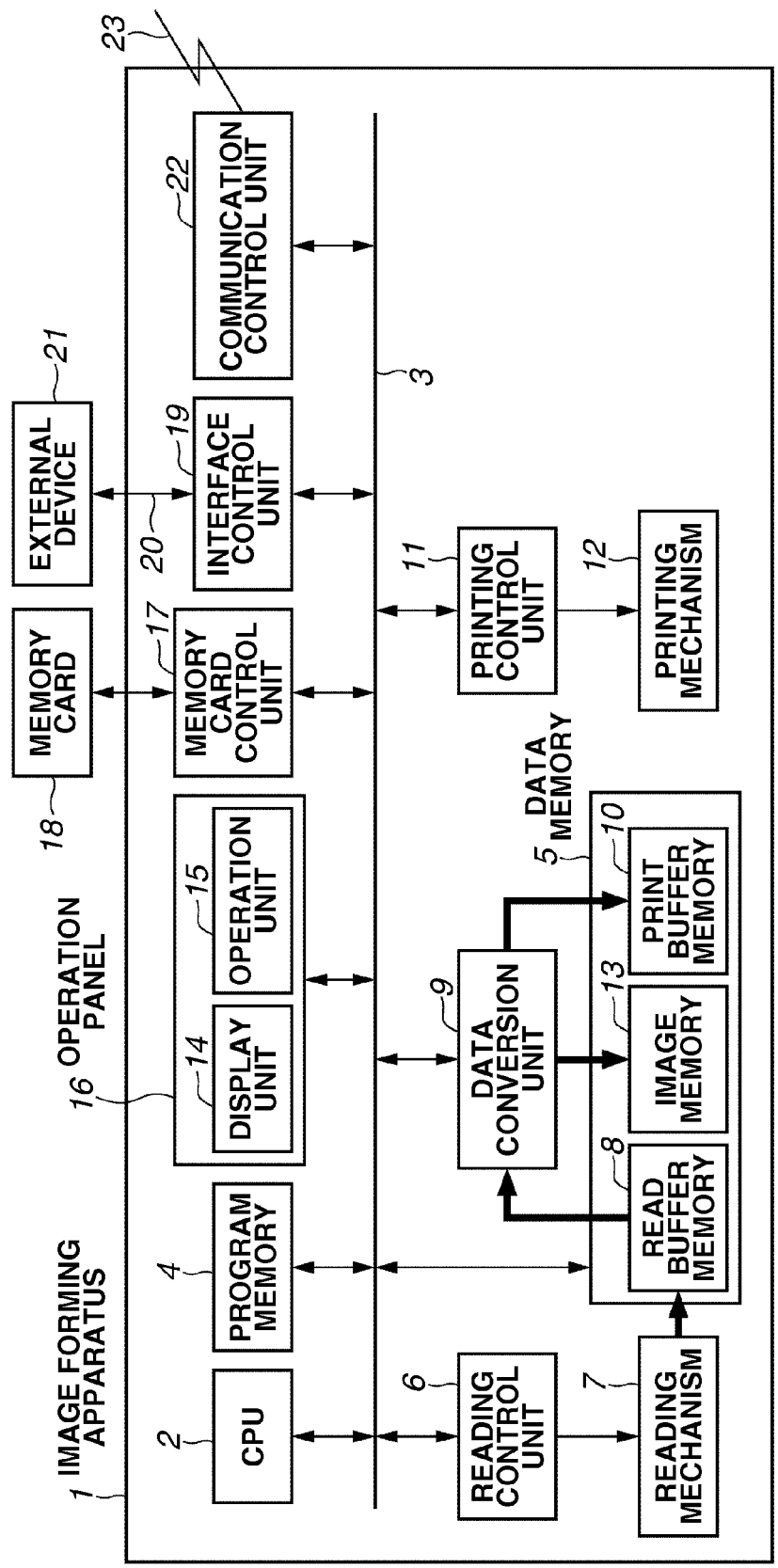
FIG. 1 is a block diagram illustrating a configuration of an image combining apparatus according to an exemplary embodiment of the present invention.

FIG. 1 is a block diagram illustrating the configuration of the image combining apparatus according to a first exemplary embodiment of the present invention.

Referring to FIG. 1, an image combining apparatus 1 includes a central processing unit (CPU) 2 which is a microprocessor. The CPU 2 operates according to a control program stored in a program memory 4 connected to the CPU 2 via an internal bus 3, and a content of a data memory 5 which is a random access memory (RAM). Processes to be described below are realized by the CPU 2 executing the control program stored in the program memory 4.

The CPU 2 causes a reading mechanism 7, i.e., a reading unit, to operate via a reading control unit 6. The CPU 2 thus stores in a read buffer memory 8 in the data memory 5 document image data read by an image sensor (not illustrated) disposed inside the reading mechanism 7.

A data conversion unit 9 reads the document image data stored in the read buffer memory 8, converts the read document image data to print data, and stores the converted data in a print buffer memory 10 in the data memory 5. The CPU 2 causes a printing mechanism 12, i.e., a printing unit, to operate via a print control unit 11. Further, the CPU 2 reads the print data stored in the print buffer memory 10, transmits the read data to the print mechanism 12 to be printed, and thus realizes a copy operation.

The data memory 5 includes an image memory 13, so that various image data other than the document image data read by the reading mechanism 7 can be temporarily stored and be edited. The image combining apparatus 1 can print the photo images and other images, in addition to copying the images by the data conversion unit 9, which reads out the image data stored in the image memory 13 and converts the image data to the print data.

The buffer memory 8, the print buffer memory 10, and the image memory 13 in the data memory 5 are managed by the CPU 2 to be operable by dynamically changing allocated capacities of each memory according to the operation status such as an operation mode or a user setting.

Further, the data conversion unit 9 performs image processing such as image analysis, thumbnail generation, thumbnail correction and output image correction.

In addition to control programs that control the CPU 2, the program memory 4 previously records standard image data such as standard images for decorating the photo image to be used in combined images.

Further, the image combining apparatus 1 includes an operation panel 16 configured with a display unit 14 such as a light emitting diode (LED) or a liquid crystal display (LCD) and an operation unit 15 that includes various keys. The operation panel 16 allows an operator to make various input operations and displays the operation status.

A memory card control unit 17 controls the access to a memory card 18 which is a recording medium, and reads and writes the data stored in the memory card 18 such as the image data. The memory card control unit 17 thus reads out and stores in the image memory 13 the photo image data stored in the memory card 18, converts the photo image data to print data, and prints the print data. Further, the memory control unit 17 reads out the document image data stored in the read buffer memory 8 using the data conversion unit 9 and stores the read image data in the image memory 13. The memory card control unit 17 then converts the stored data to image recording data and writes and records the image recording data in the memory card 18.

An interface control unit 19 controls communication via an interface 20 and transmits and receives data to and from an external device 21 connected to the image combining apparatus 1. An example of the external device 21 is a personal computer (PC), and the image combining apparatus 1 connects to the PC to receive print data created by a printer driver operating in the PC. Further, the image combining apparatus 1 connects to the PC and receives a read request from a scanner driver operating in the PC. The image combining apparatus 1 then reads out the document image data stored in the read buffer memory 8 using the data conversion unit 9 and transmits the image data to the PC. Furthermore, the image combining apparatus 1 is connected to a device such as the digital camera. The image combining apparatus 1 reads out and stores in the image memory 13 the photo image data, converts the image data to the print data, and prints the print data.

A communication control unit 22 is configured of a modulator-demodulator (modem) or a network control unit (NCU). The communication control unit 22 is connected to an analog communication line 23 and performs communication control and line control such as an outgoing call or an incoming call control on the communication line.

Figure 2:
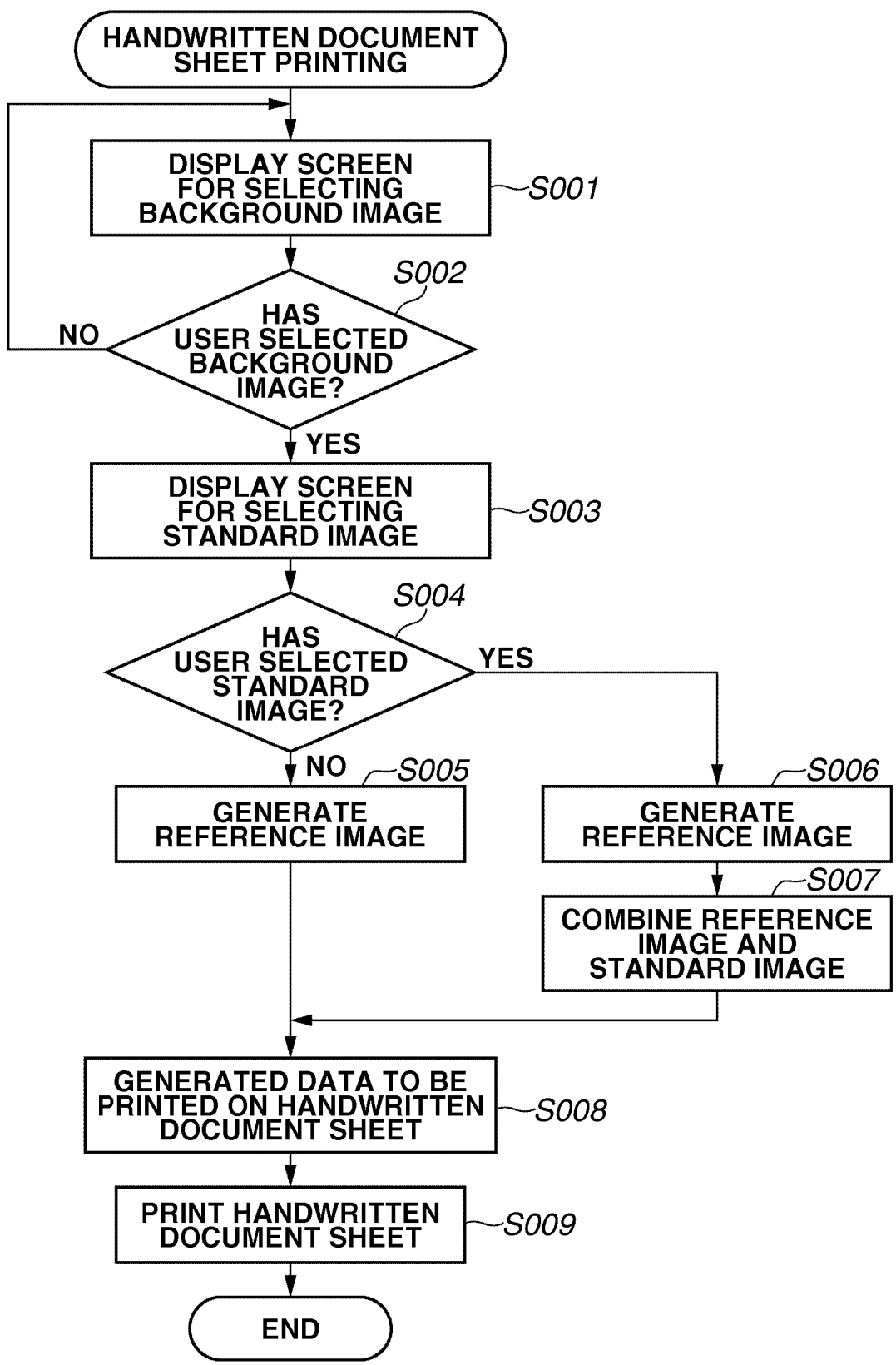
FIG. 2 is a flowchart illustrating a process of printing a handwritten document sheet.

FIG. 2 is a flowchart illustrating a process of printing the handwritten document sheet.

The process illustrated in FIG. 2 is executed by the CPU 2 in the image combining apparatus 1 when the user selects "print handwritten document sheet" in a menu displayed on the operation panel 16.

In step S001, the CPU 2 reads an image data file of the background images stored in the memory card 18 and displays a selection screen on the display unit 14, so that the user can select the background image. In step S002, the CPU 2 determines whether the user has selected the background image by operating the keys on the operation unit 15. If the CPU 2 determines that the user has not selected the background image 38 illustrated in FIG. 3 (NO in step S002), the process returns to step S001.

On the other hand, if the CPU 2 determines that the user has selected the background image (YES in step S002), the process proceeds to step S003. In step S003, the CPU 2 reads the image data file of the standard images stored in the program memory 4 and displays the selection screen on the display unit 14. The user can then operate the keys to determine whether to combine the standard image, or select the standard image to be combined. Details will be described below with reference to FIG. 5.

In step S004, the CPU 2 determines whether the user selected the standard image or whether the standard image is to be combined in step S003. If the CPU 2 determines that the user has not selected the background image (NO in step S004), the process proceeds to step S005. In step S005, the CPU 2 generates the reference image based on the background image selected in step S002 and stores the reference image in the image memory 13.

Figure 3:
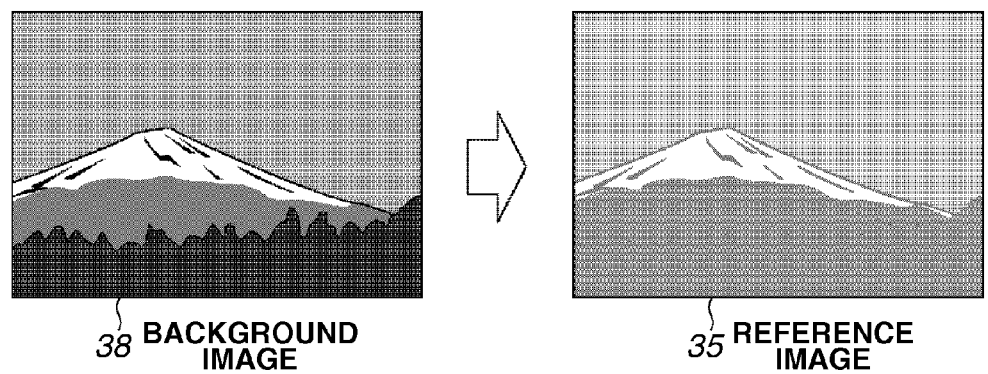
FIG. 3 is illustrates an example of the reference image.

The reference image is an image acquired by converting the background image such as the photo image so that the luminance becomes high. More specifically, the reference image is acquired by causing the color of the background image to be lighter. FIG. 3 illustrates an example of the reference image. A reference image 35 is an image acquired by converting a background image 38 so that the color becomes lighter. The process of generating the reference image will be described in detail below.

Returning to FIG. 4, if the CPU 2 determines that the use has selected the standard image (YES in step S004), the process proceeds to step S006. In step S006, the CPU 2 generates the reference image similarly as in step S005. In step S007, the CPU 2 combines the standard image selected in step S003 with the reference image generated in step S006. The combined image can be referred to as the first image.

Figure 4:
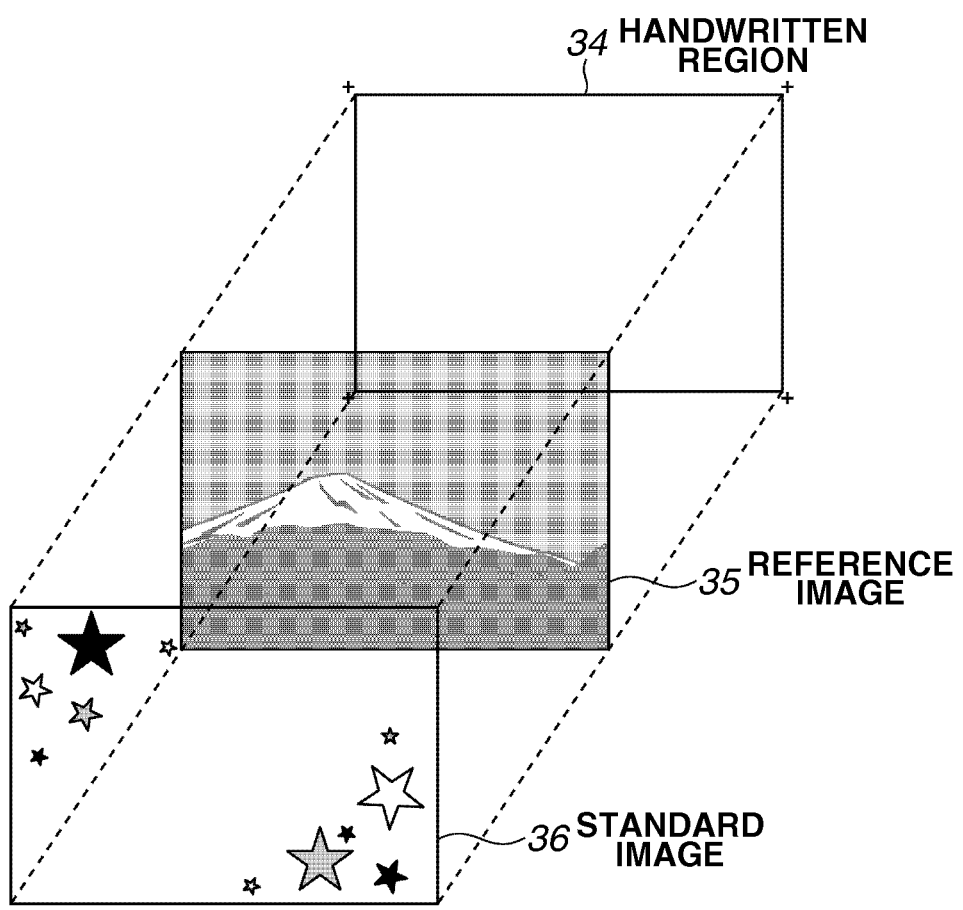
FIG. 4 illustrates a process of combining the standard image and the reference image.

FIG. 4 illustrates the process of combining the standard image and the reference image. The CPU 2 determines whether each pixel data of a standard image 36 is transmission information. If the pixel data is the transmission information, the image data of the reference image 35 is used. If the pixel data is not the transmission information, a pixel of the standard image 36 is used.

In step S008 illustrated in FIG. 2, the CPU 2 generates the print data of the reference image generated in step S005 or the combined image generated in step S007. In addition to the combined image, the CPU 2 generates the print data of a bar code indicating a setting region in which the user specifies various settings, and other settings stored in the program memory 4. For example, the bar code records information indicating a recording destination of the background image selected by the user in step S002. Further, the barcode records whether the user selected combining of the standard image in step S004, and types of standard images to be combined.

In step S009, the CPU 2 controls the printing mechanism 12 and prints the handwritten document sheet based on the print data generated in step S008.

Figure 5:
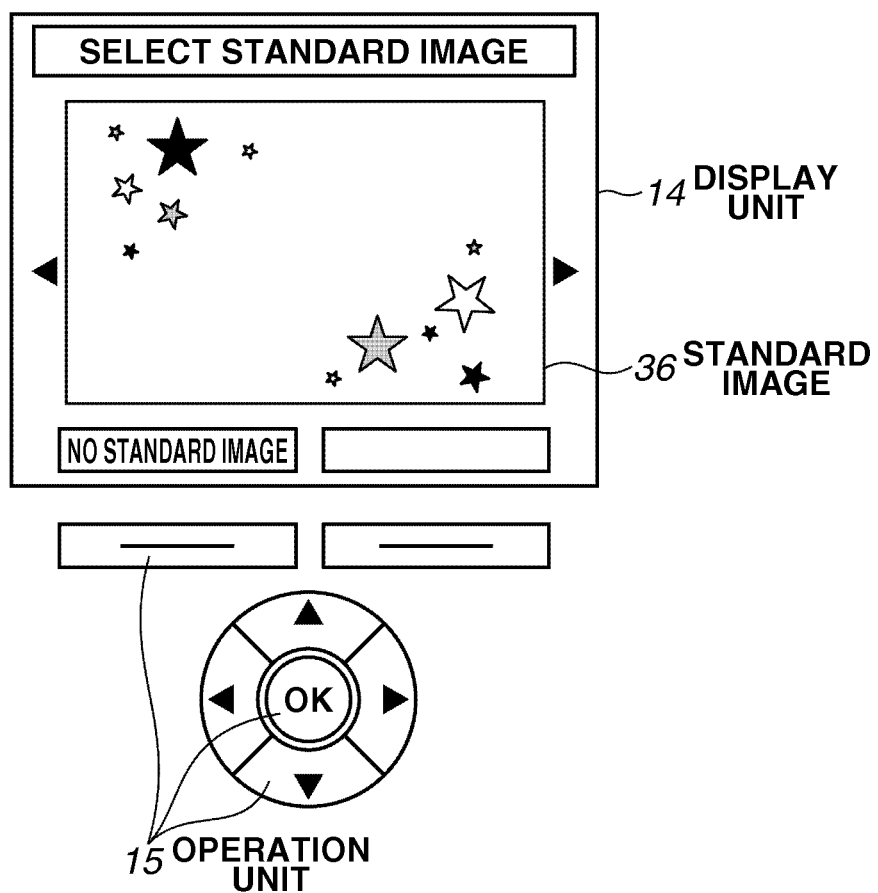
FIG. 5 illustrates a screen displayed in step S003 illustrated in FIG. 2 for the user to select the standard image.

FIG. 5 illustrates the screen for selecting the standard image which is displayed in step S003 illustrated in FIG. 2.

The standard image 36 stored in the program memory 4 is read and displayed on the display unit 14. The user can change the standard image 36 displayed on the display unit 14 by pressing a direction key of the operation unit 15. If the user then presses an OK key of the operation unit 15, the CPU 2 determines in step S004 that the user selected the displayed standard image 36. On the other hand, if the user selects "no standard image" and presses the OK key, the CPU 2 determines in step S004 that the standard image is not to be combined.

The process of generating the reference image from the background image (i.e., process of step S005 and step S006 illustrated in FIG. 2) will be described in detail below. If the user selected the background image in step S002 illustrated in FIG. 2, the data file of the selected background image is stored in the image memory 13.

The CPU 2 acquires the luminance data (Rorg, Gorg, and Borg) of the background data stored in the image memory 13. The values of the luminance data Rorg, Gorg, and Borg are between 0 and 225.

The CPU 2 then performs gradation conversion using equations 1, 2, and 3 described below to acquire the pixel data of the reference image (Rref, Gref, and Bref).

$$Rref = (255 - RmiN) + ((Rorg/255) * RmiN) \qquad 1$$

$$Gref = (255 - GmiN) + ((Gorg/255) * GmiN) \qquad 2$$

$$Bref = (255 - BmiN) + ((Borg/255) * BmiN) \qquad 3$$

The CPU 2 repeats the above-described process for all pixel data of the background image 38. As a result, the reference image in which the luminance is limited to be greater than or equal to (RmiN, GmiN, and BmiN) can be generated.

Figure 6:
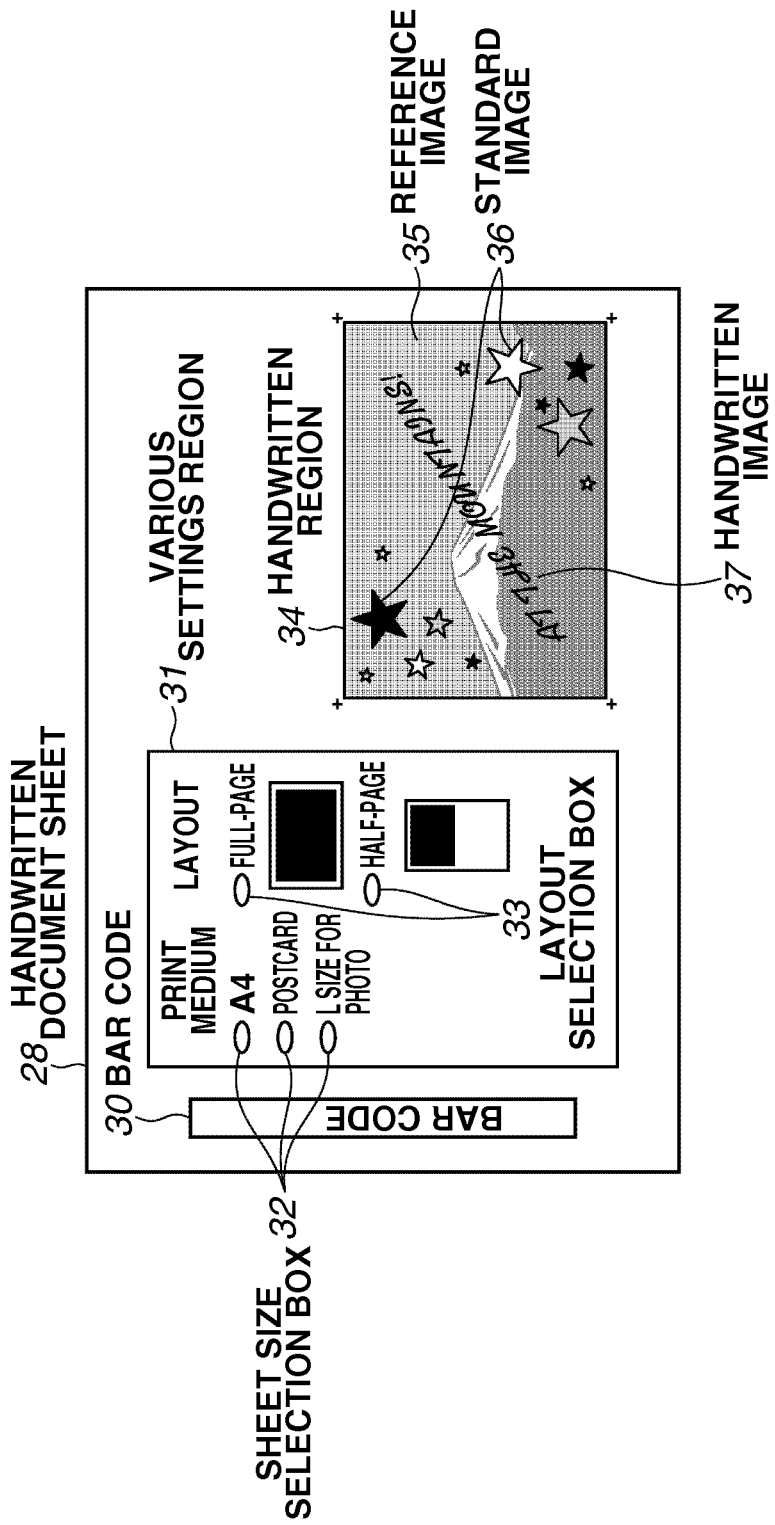
FIG. 6 illustrates an example of the handwritten document sheet according to the exemplary embodiment of the present invention.

FIG. 6 illustrates an example of the handwritten document sheet according to the present exemplary embodiment, which is printed according to the flowchart illustrated in FIG. 2.

Referring to FIG. 6, a bar code 30 is disposed in the handwritten document sheet. As described above, the information about where the background image is recorded, whether the standard image is to be combined, and the type of the standard image to be combined are recorded in the bar code 30.

A setting region 31 is disposed on the right side of the bar code 30 in the handwritten document sheet. The user can select the print setting by filling in selection boxes in the setting region 31. In the example illustrated in FIG. 6, the user fills in one of paper size selection boxes 32 to select the size of the recording sheet to be printed. Similarly, the user can select the layout of the recording sheet to be printed by filling in one of layout selection boxes 33.

A handwritten region 34 is a region for the user to write characters and pictures to be combined with the background image. The characters and pictures written in the handwritten region 34 become the handwritten image.

Further, the combined image acquired by superposing the reference image 35 generated in step S007 of FIG. 2 on the standard image 36 is printed in the handwritten region 34.

Figure 7:
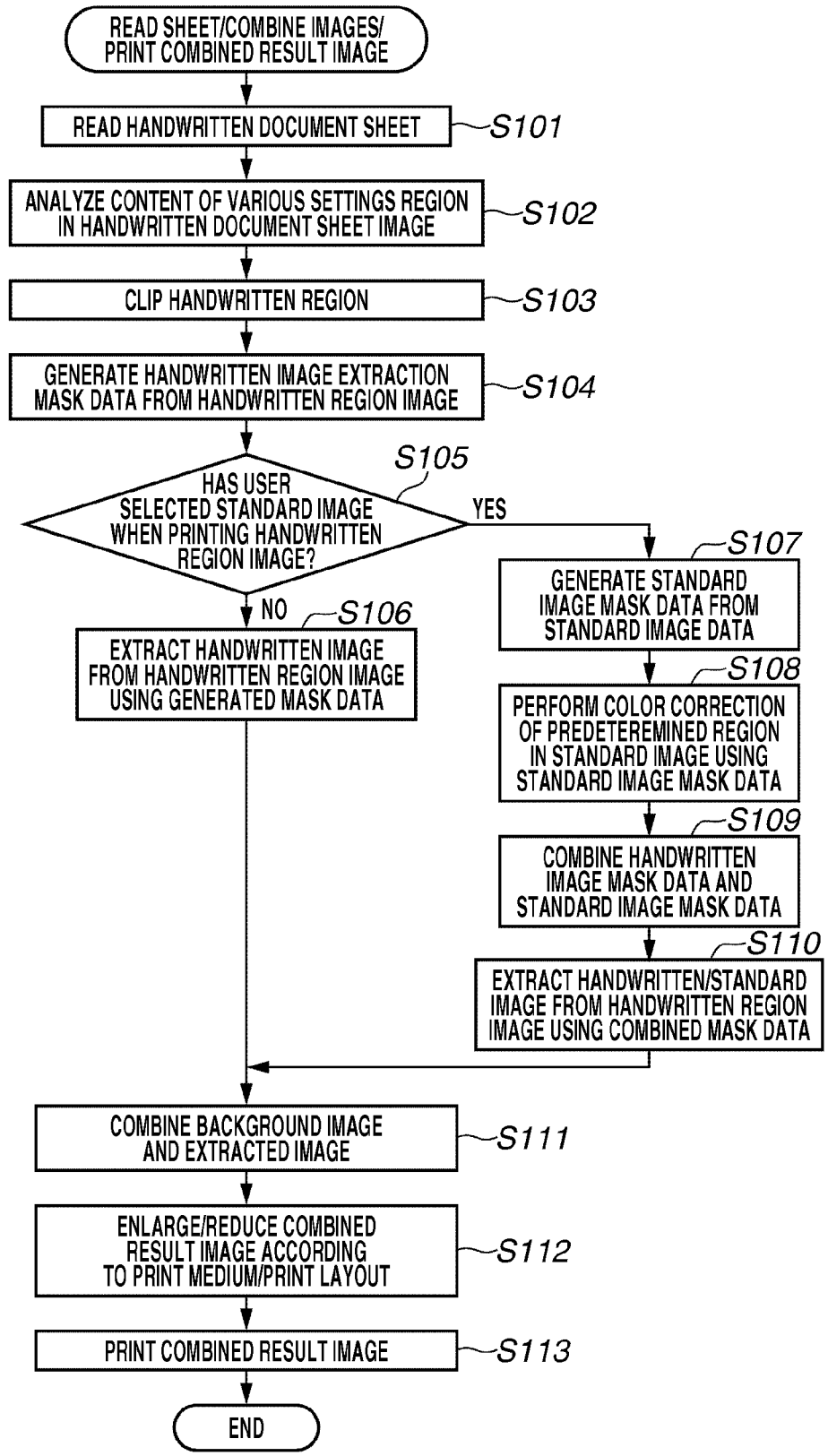
FIG. 7 is a flowchart illustrating a process of reading the handwritten document sheet filled in by the user and printing the combined image.

FIG. 7 is a flowchart illustrating the process of reading the handwritten document sheet which the user has written in and printing the combined result image. The process illustrated in FIG. 7 is executed by the CPU 2 in the image combining apparatus 1 when the user selects "read handwritten document sheet/print combined image" in the menu displayed on the operation panel 16.

In step S101, the CPU 2 controls the reading mechanism 7 to read the handwritten document sheet and stores the read result as a handwritten document sheet image in the read buffer memory 8. In step S102, the CPU 2 analyzes the handwritten document sheet image acquired in step S101 and acquires print information. For example, the CPU 2 clips the bar code 30 illustrated in FIG. 6 from the read handwritten document sheet image. The CPU 2 then analyzes the bar code 30 and acquires the information about the recording sheet that records the background image selected by the user, or the type of the standard image. Further, the CPU 2 clips the setting region 31 illustrated in FIG. 6, analyzes how the sheet size selection box 32 is filled in, and acquires the information about the selection of the sheet size to be printed. Furthermore, the CPU 2 analyzes how the layout selection box 33 is filled in and acquires information about the selection of the layout to be printed.

In S103, the CPU 2 clips an image that corresponds to the handwritten region described in FIG. 6 (i.e., a handwritten region image) from the handwritten document sheet image acquired in step S101. The process will be described in detail below with reference to FIG. 10. The clipped image can be referred to as the second image. In step S104, the CPU 2 generates handwritten image mask data for extracting the handwritten image from the handwritten region image. The process will be described in detail below with reference to FIG. 11.

In step S105, the CPU 2 determines whether the user has selected the standard image in the process of printing the handwritten document sheet illustrated in FIG. 2, based on the result of analyzing the bar code 30 in step S102. If the CPU 2 determines that that user has not selected the standard image (NO in step S105), the process proceeds to step S106. In step S106, the CPU 2 uses the handwritten image mask data generated in step S104 to extract the handwritten image from the handwritten region image. On the other hand, if the CPU 2 determines that the user has selected the standard image (YES in step S105), the process proceeds to step S107. In step S107, the CPU 2 generates standard image mask data from the digital image data of the standard image selected by the user when printing the handwritten document sheet.

In step S108, the CPU 2 performs color adjustment on a predetermined region in the handwritten region image, based on the standard image mask data generated in step S107 using a method described below with reference to FIG. 14. In step S109, the CPU 2 combines the handwritten image mask data generated in step S104 and the standard image mask data generated in step S107 and generates combined mask data. In step S110, the CPU 2 extracts the image from the handwritten region image using the combined mask data generated in step S109. The extracted image becomes an extracted handwritten/standard image.

In step S111, the CPU 2 reads out from the memory card 18 the background image selected by the user in step S002 illustrated in FIG. 2. The CPU 2 then combines the read out background image and the image extracted in step S106 or step S110 and generates the combined image (hereinafter referred to as a combined result image). The process will be described below with reference to FIG. 8.

Figure 8:
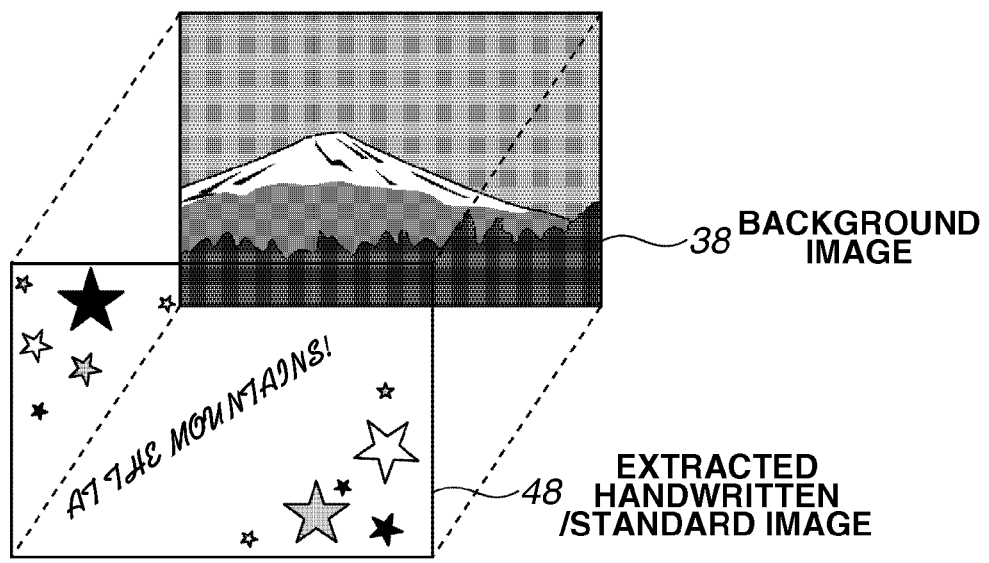
FIG. 8 illustrates an example of a process of generating the combined image.

FIG. 8 illustrates an example of the process of creating the combined result image. Referring to FIG. 8, if a pixel is determined to be in the handwritten portion or the standard portion, pixel data of the handwritten/standard image extracted in S110 is used. Pixels which are determined to be neither the handwritten portion nor the standard portion are determined to be the background portion and the pixel data of the selected background image 38 is used. As a result, the combined result image in which the background image, the standard image, and the handwritten image are combined is generated.

In step S112 in FIG. 7, the CPU 2 enlarges or reduces the combined result image based on the sheet size selection information and the layout information acquired in step S102. In step S113, the CPU 2 controls the printing mechanism 12 to print the combined result image which is enlarged or reduced in step S112, on the recording sheet.

FIG. 9 illustrates an example of a result of printing the combined result image. Referring to FIG. 9, the combined result image can be printed using various layouts. The process performed in step S113 can be referred to as a second print control.

The process of creating the handwritten image mask data from the handwritten region image described in step S104 illustrated in FIG. 7 will be described below.

The CPU 2 acquires the luminance data of each pixel in the handwritten region image (RScaN, GScaN, and BScaN) and checks whether the luminance data of each pixel is greater than or equal to a predetermined threshold value (Rth, Gth, and Bth)

$$R\text{ScaN} > R\text{th} \qquad \qquad 4$$

$$G\text{ScaN} > G\text{th} \qquad \qquad 5$$

$$B\text{ScaN} > B\text{th} \qquad \qquad 6$$

If all of the above-described inequalities 4 to 6 become true, the luminance level of the focused pixel in the handwritten region image is higher than or equal to a predetermined level, and the focused pixel is thus determined to be the background portion. On the other hand, if one of the above-described inequalities 4 to 6 is not true, the luminance level of the focused pixel is lower than or equal to a predetermined level, and the focused pixel is determined to be the handwritten portion.

Figure 10:
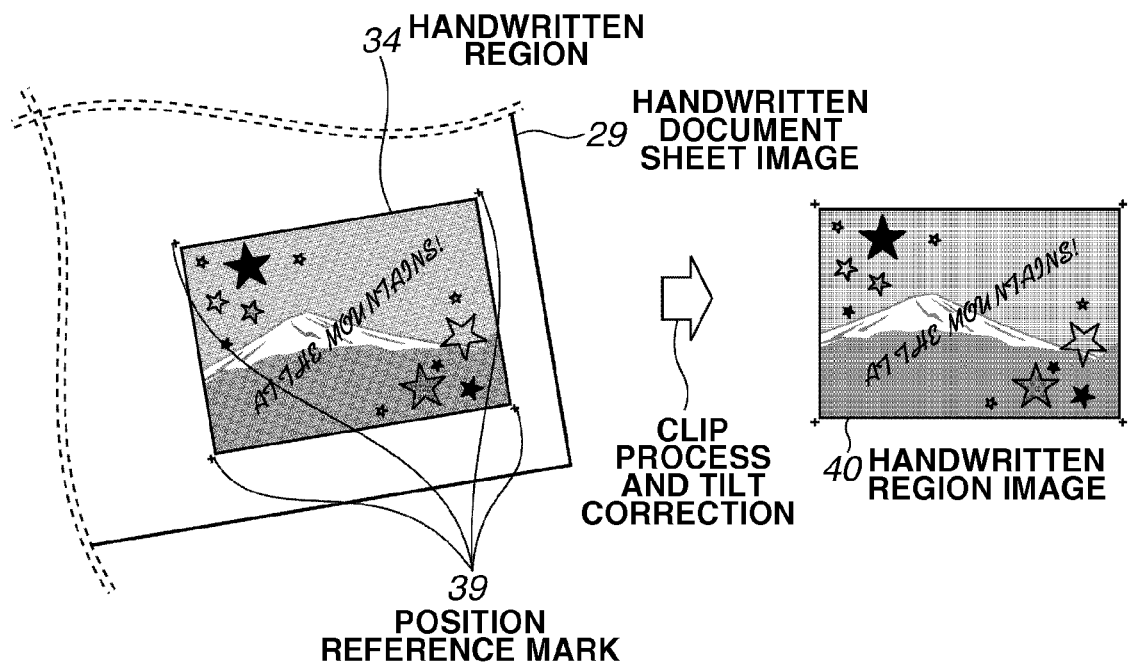
FIG. 10 illustrates a process of cutting out a handwritten region image.

FIG. 10 illustrates the process of clipping the handwritten region image (described in step S103 illustrated in FIG. 2).

Referring to FIG. 10, after reading the handwritten document sheet, the CPU 2 detects a position reference mark 39 in a handwritten document sheet image 29 stored in the read buffer memory 8. The position reference mark 39 indicates the position and tilt of the handwritten region 40 in the handwritten document sheet image 29. The CPU 2 can recognize the position and the tilt of a handwritten region image 40 in the handwritten document sheet image 29 based on the detected position reference mark 39. The CPU 2 then corrects the tilt according to the recognized position and tilt, clips the handwritten region image 40 from the handwritten document sheet image 29, and stores the handwritten region image 40 in the image memory 13.

FIGS. 11A, 11B, 11C, 11D, and 11E illustrate an example of the process of generating the handwritten image mask data.

Figure 11A:
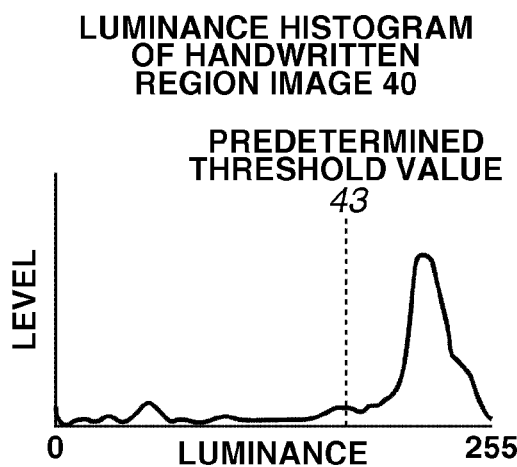
FIGS. 11A to 11C illustrate an example of generating handwritten image mask data.
Figure 11B:
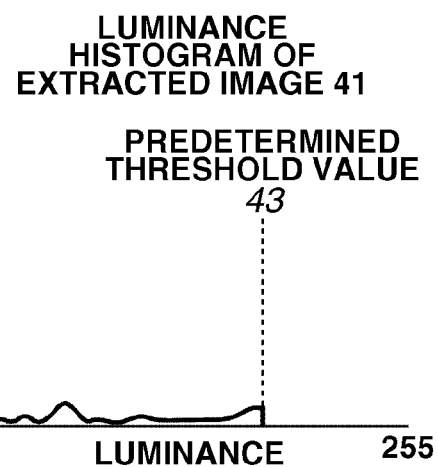

FIG. 11A illustrates a luminance histogram of the handwritten region image 40. The CPU 2 sets a predetermined threshold value 43 in the histogram and extracts a region in which the luminance value is lower than or equal to the threshold value as illustrated in FIG. 11B. The extracted region thus becomes an extracted image 41. In general, since the user uses a dark color for writing the characters or the picture, the luminance value of the handwritten region is lower than the threshold value 43, so that the region can be extracted.

Figure 11C:

The CPU 2 then performs binary processing based on the extracted image 41 by setting the information of the extracting region to 1 and the information of the region which is not extracted to 0. The handwritten image mask data 42 illustrated in FIG. 11C is thus generated. When the CPU 2 extracts the image using such mask data, the CPU 2 extracts the image of the region corresponding to the region in the mask data in which the information is set to 1.

The CPU 2 extracts the portion of the standard image whose luminance value is lower than the threshold value 43 as the extracted image 41. However, the CPU 2 does not extract the portion whose luminance value is higher than the threshold value. Therefore, not all of the regions corresponding to the standard image 36 in the handwritten image mask data 42 become 1, and a portion of the mask data of the standard image region may become missing. However, when the CPU 2 combines the handwritten image mask data 42 and standard image mask data 45 in step S109 illustrated in FIG. 7, the missing region is complemented by the standard image mask data 45. More specifically, the handwritten image mask data 42 becomes the mask data for extracting the handwritten image, and it becomes unnecessary to consider the region corresponding to the standard image 36.

Figure 12:
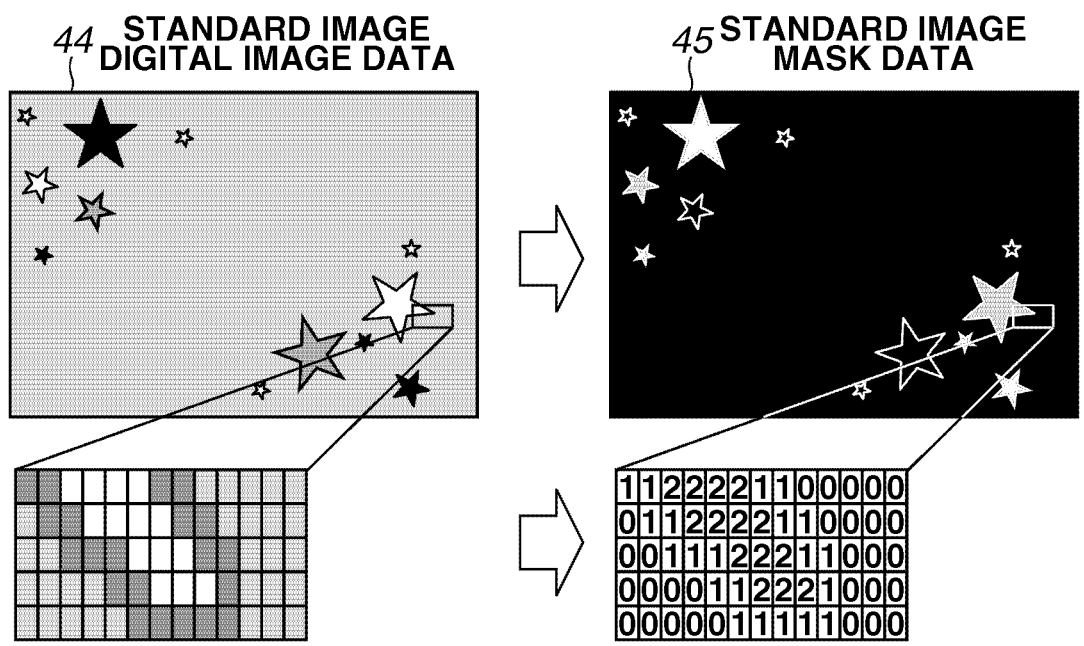
FIG. 12 illustrates a process of generating standard image mask data from the digital image data of the standard image.

FIG. 12 illustrates the process of generating the standard image mask data 45 from the digital image data of the standard image (i.e., performed in step S107 illustrated in FIG. 7). The process can be referred to as a second generation process.

The CPU 2 reads out from the program memory 4 standard image digital image data 44 which is the digital image data of the standard image selected by the user. The CPU 2 then checks whether each pixel is the transmission information, based on whether the luminance data of each pixel is a predetermined value corresponding to the transmission information. If the focused pixel is the transmission information, the information corresponding to the focused pixel in the standard image mask data 45 is set to 0. The CPU 2 then checks whether each pixel is in the standard portion which is to be color-adjusted, according to whether the luminance data of each pixel in the standard image digital image data 44 is a predetermined value corresponding to a color adjustment target. If the luminance data of the focused pixel is a value to be color-adjusted, the information corresponding to the focused pixel in the standard image mask data 45 is set to 2. Further, if the luminance value of the focused pixel is not a value to be color-adjusted and the focused pixel is not the transmission information, the information corresponding to the focused pixel in the standard image mask data 45 is set to 1. The information is set to 1 as corresponding to the standard portion which is not to be color-adjusted.

The predetermined luminance value for a pixel to become the above-described color adjustment target is determined by the objective of the color adjustment. For example, if color adjustment is to be performed on a white color region to remove the background color, the predetermined value is set to red, green, and blue (255, 255, and 255). Further, a plurality of values can be set to the predetermined value for performing color adjustment, in order to set the region of a certain range as the color adjustment target. Furthermore, since the white color and the light color generally tend to be affected by the background color, it is effective to set the pixel having a luminance value greater than or equal to the predetermined threshold value as the color adjustment target.

In the present exemplary embodiment, the information corresponding to the focused pixel which is the transmission information in the standard image mask data is set to 0. Further, information corresponding to the standard portion which is not to be color-adjusted is set to 1, and the standard portion to be color-adjusted is set to 2. Therefore, as illustrated in FIG. 12, the regions corresponding to 0, 1, and 2 in the standard image mask data 45 can each be recognized as a non-extracted region, an extracted region, and a color adjustment region and the extracted region respectively. The contraction process illustrated in FIGS. 13A and 13B can be performed when generating the standard image mask data to reduce the mismatch between the boundaries of the handwritten region image and the standard image mask data.

Figure 13A:
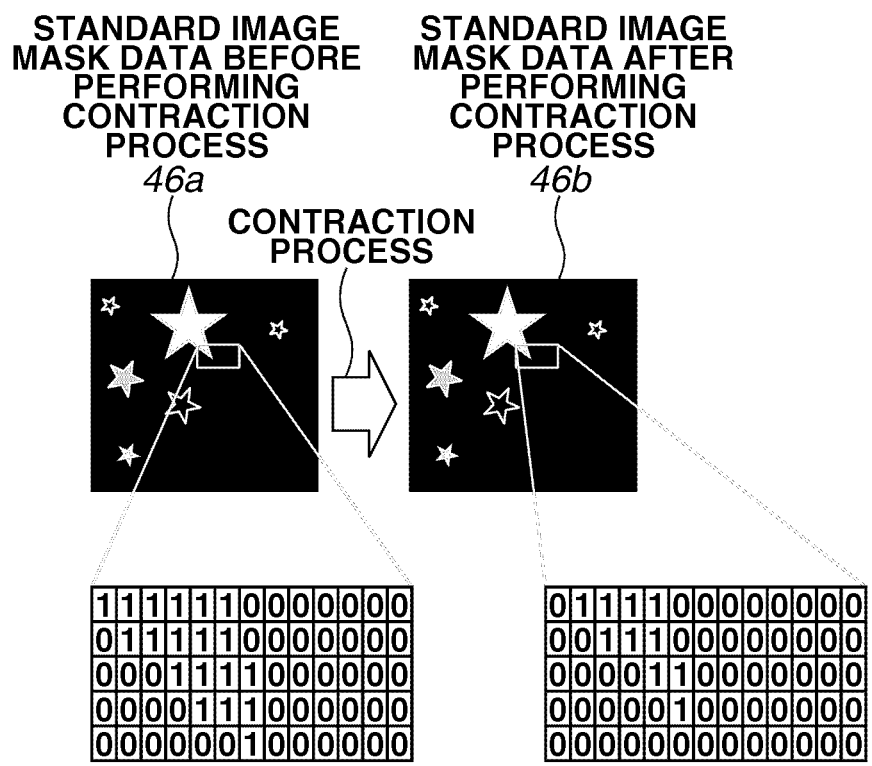
FIGS. 13A and 13B illustrate a contraction process performed on the standard image mask data.
Figure 13B:
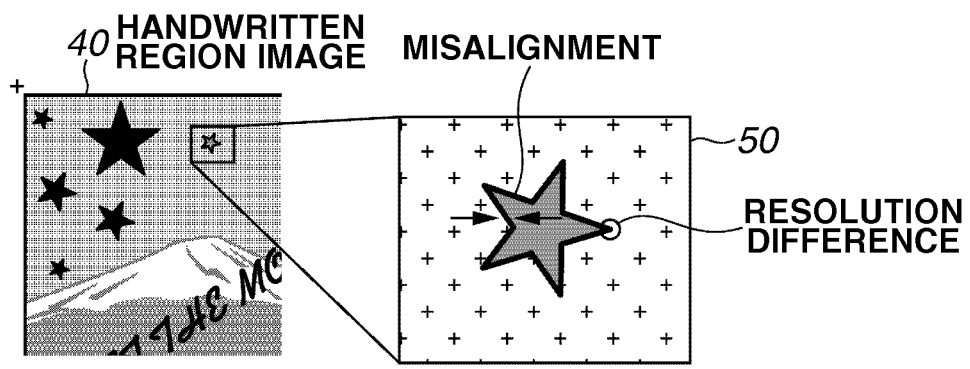

FIGS. 13A and 13B illustrate the contraction process performed on the standard image mask data.

Referring to FIG. 13B, an image 50 is an enlarged image of the standard image extracted from the handwritten region image 40 using the standard image mask data 45.

The pixel in the boundary region between the reference image and the standard image in the handwritten region image include information about both images. As a result, the distinction between the regions of both images may become unclear, or the boundary of the regions may become displaced depending on a degree of error. Further, if there is ink bleeding when the handwritten document sheet is printed, or if the resolutions of the two images are different, the boundary between the reference image and the standard image may expand or contract. The distinction of the regions of the images may thus become unclear. In such a case, the standard image may not be appropriately extracted as in the image 50.

To overcome such a problem, the standard mask data is contracted, as illustrated in FIG. 13A.

Referring to FIG. 13A, the CPU 2 checks the information about 4 pixels near the focused pixel in the standard image mask data 45. If there is even one pixel whose information is 0, the information of the focused pixel is set to 0. If the information of all pixels is 1, the information of the focused pixel is set to 1. The process is performed on the entire standard image mask data 45, so that the region in which the pixel information is 1, that is, the region for extracting the standard image can be contracted. 8 pixels near the focused pixel can be used in the contraction process, and the amount of contraction can be increased and decreased by changing the number of times of performing the contraction process.

As described above, the region to be extracted is contracted by contracting the standard image mask data. Therefore, an effect of the unclear or displaced boundary between the reference image and the standard image in the handwritten region image can be reduced.

Figure 14A:
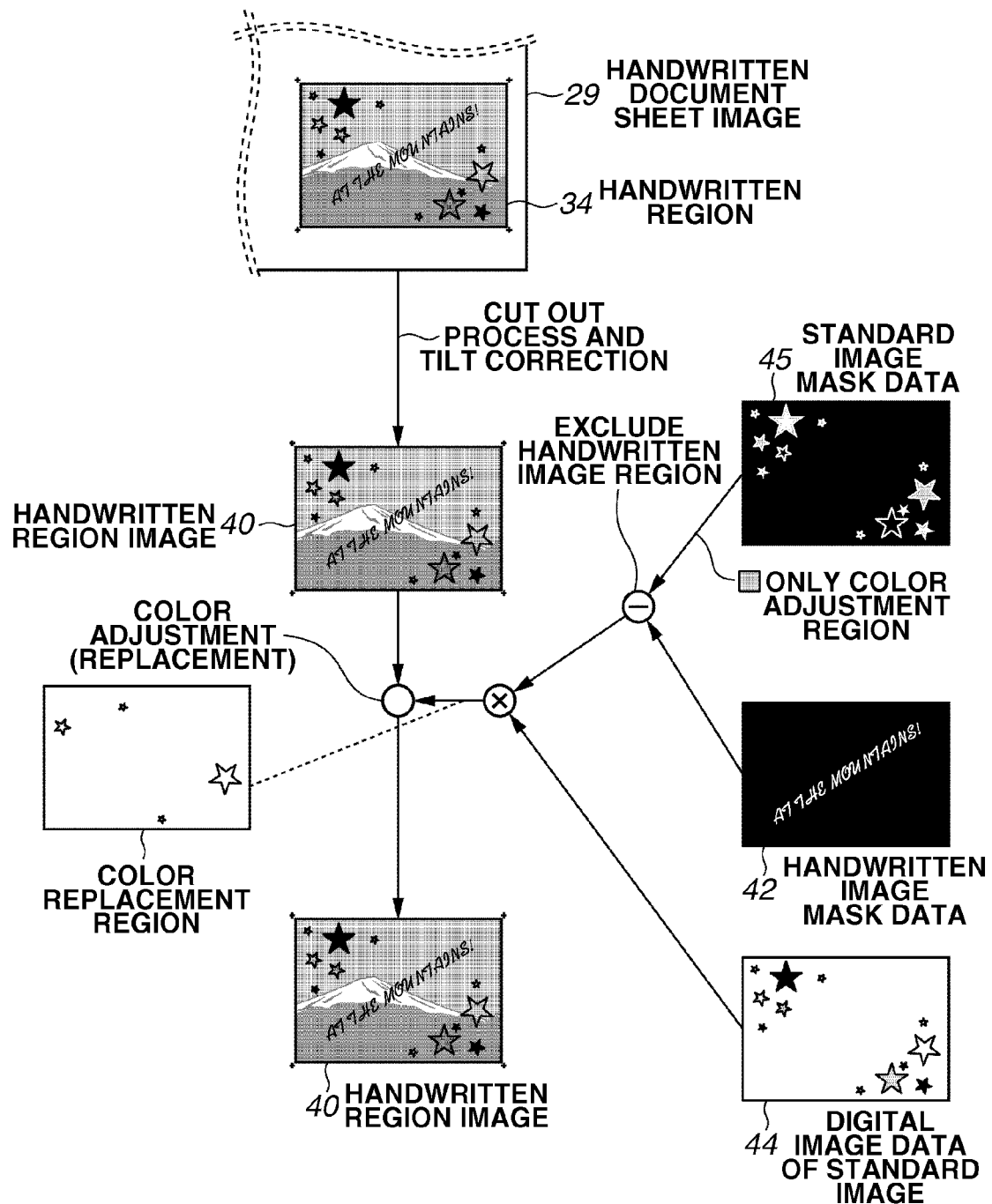
FIGS. 14A and 14B illustrate color adjustment performed on a predetermined portion of the handwritten region image based on the standard image mask data.
Figure 14B:
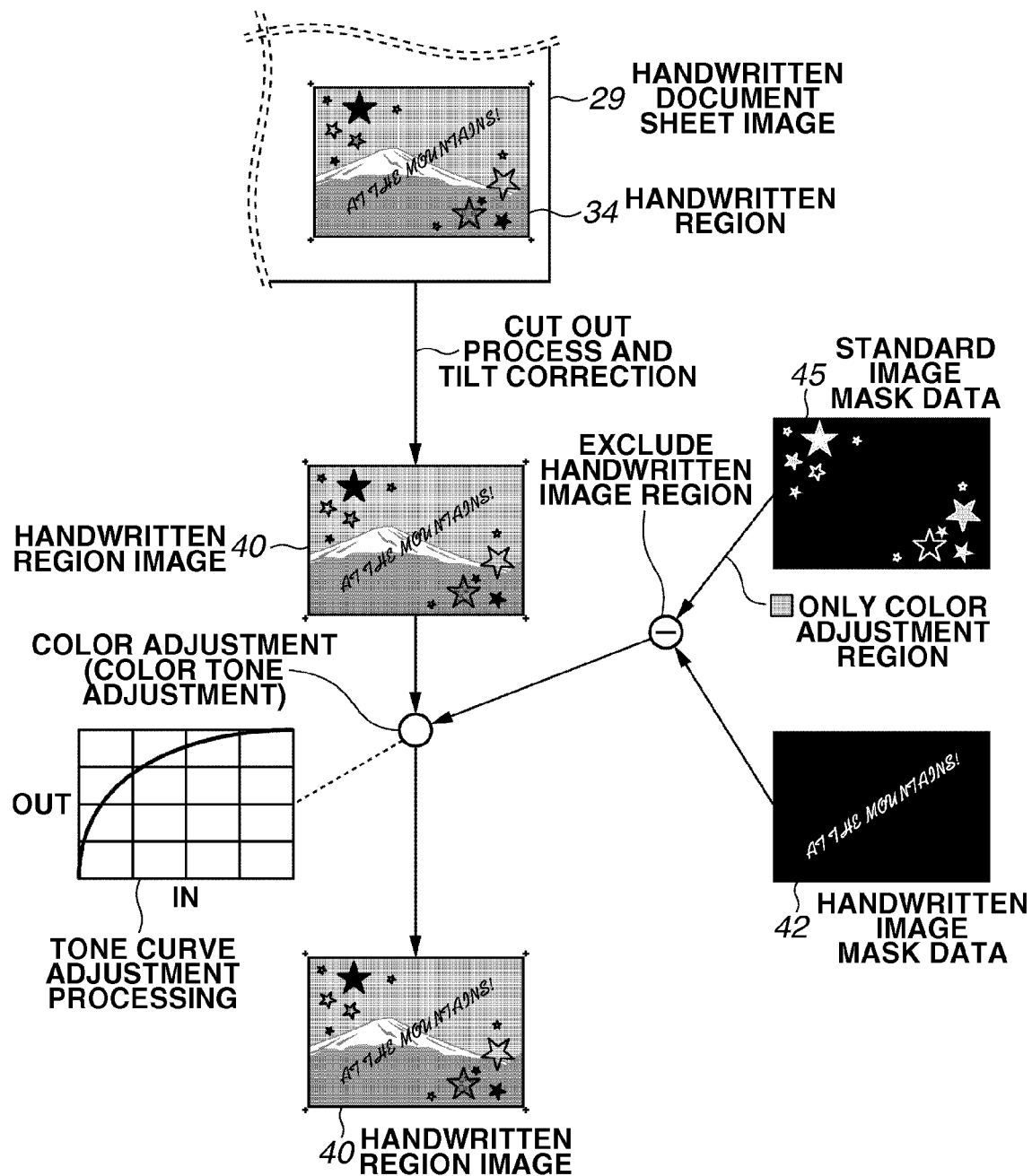

FIGS. 14A and 14B illustrate the color adjustment process on a predetermined region of the handwritten region image using the standard image mask data, performed in step S108 illustrated in FIG. 7. The present exemplary embodiment describes color adjustment to remove the background color in the white color region of the standard image 36.

When a paper of low whiteness or having a background color is used in printing the handwritten document sheet, the white color portion or the region which is lightly printed in the handwritten document sheet is affected by the background color of the sheet, as illustrated in the handwritten document sheet image 29 in FIGS. 14A and 14B. As a result, a hue of the white color portion or the region which is lightly printed in the standard image 36 in the handwritten region image 40 becomes different from the color of the digital image data 44 of the standard image.

To solve such a problem, a method for performing color adjustment using the standard image mask data will be described below with reference to FIG. 14A.

Referring to FIG. 14A, the CPU 2 extracts a color adjustment region excluding the handwritten region of the handwritten image mask data 42 from the color adjustment region of the standard image mask data 45. If the user writes on the color adjustment region of the standard image 36, the handwritten image is superposed on the color adjustment region. By extracting the color adjustment region as described above, color adjustment is not performed on the region where the handwritten image is superposed.

In the example illustrated in FIG. 14A, the standard image is not extracted using the handwritten image mask data 42. If the handwritten image mask data 42 is to extract a portion of the standard image as illustrated in FIG. 11, an overlapping portion between the standard image mask data 45 and the handwritten image mask data 42 is omitted from the color adjustment target. However, since the region corresponding to the overlapping region in the standard image is of a low luminance value (dark color), it is not easily affected by the background color of the paper and can thus be omitted from the color adjustment target.

Returning to FIG. 14A, the color adjustment region in the handwritten region image 40 is then determined based on the extracted color adjustment region, and color adjustment is performed on the color adjustment region. Color adjustment is a process of replacing the region in the handwritten region image 40 corresponding to the extracted color adjustment region with the data of the standard image digital image data 44 corresponding to the extracted color adjustment region.

In the example illustrated in FIG. 14A, color adjustment is performed by replacing a predetermined portion with the standard image digital image data 44. A method for performing color tone correction to adjust the color will be described with reference to FIG. 14B. Referring to FIG. 14B, the color adjustment region is extracted from the standard image mask data 45 similarly as in FIG. 14A. The region to be color-adjusted in the handwritten region image 40 is then determined based on the extracted color adjustment region, and color correction using a general color conversion technique such as a tone curve process is performed.

In the present exemplary embodiment, the color adjustment method is not particularly defined, and a known color adjustment method such as the image data replacement method and the color tone correction method can be used.

Further, the background color is removed by performing color adjustment as described above. However, color adjustment is effective even when the color tone of the image extracted by the mask data becomes different from the standard image data due to the color characteristic of the printing mechanism 12 or the reading mechanism 7.

Figure 15:
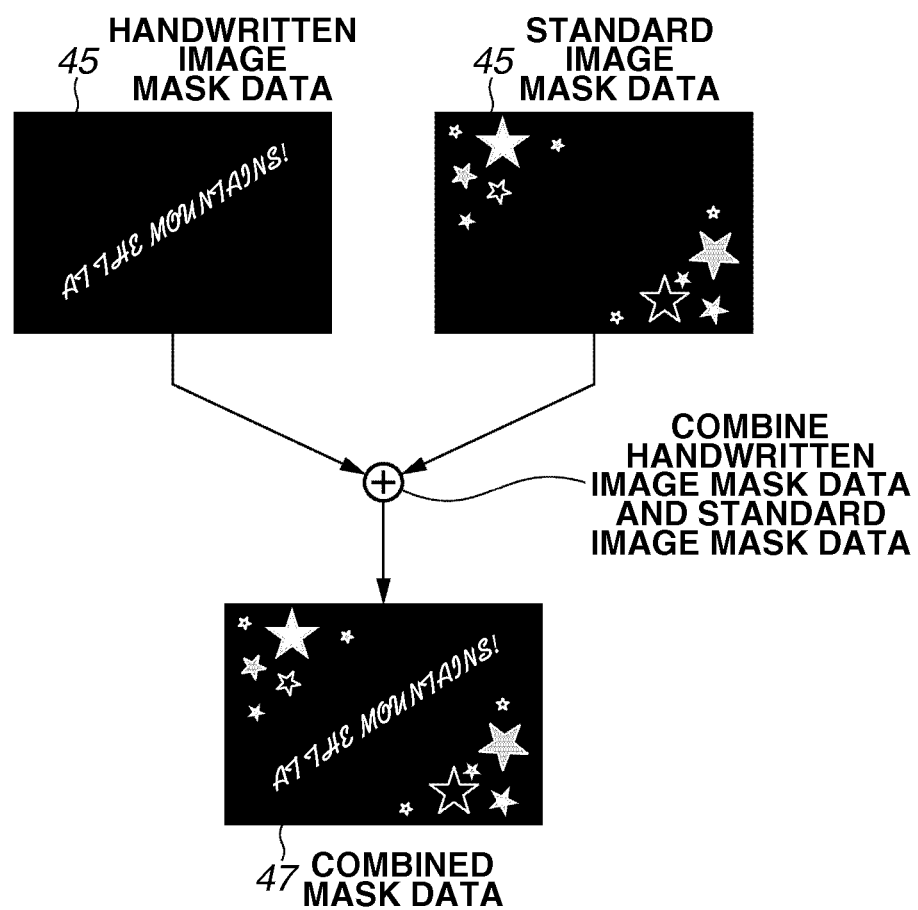
FIG. 15 illustrates a process of combining the handwritten image mask data and the standard image mask data to generate combined mask data.

FIG. 15 illustrates a process of generating the combined mask data by combining the handwritten image mask data and the standard image mask data, performed in step S109 illustrated in FIG. 7. If either of the pixels at the same position in the handwritten image mask data 42 and the standard image mask data is 1, the information corresponding to the pixel at that position is set to 1. Further, if both of the pixels at the same position in the handwritten image mask data 42 and the standard image mask data are 0, the information corresponding to the pixel at that position is set to 0 and combined mask data 47 is generated.

Figure 16:
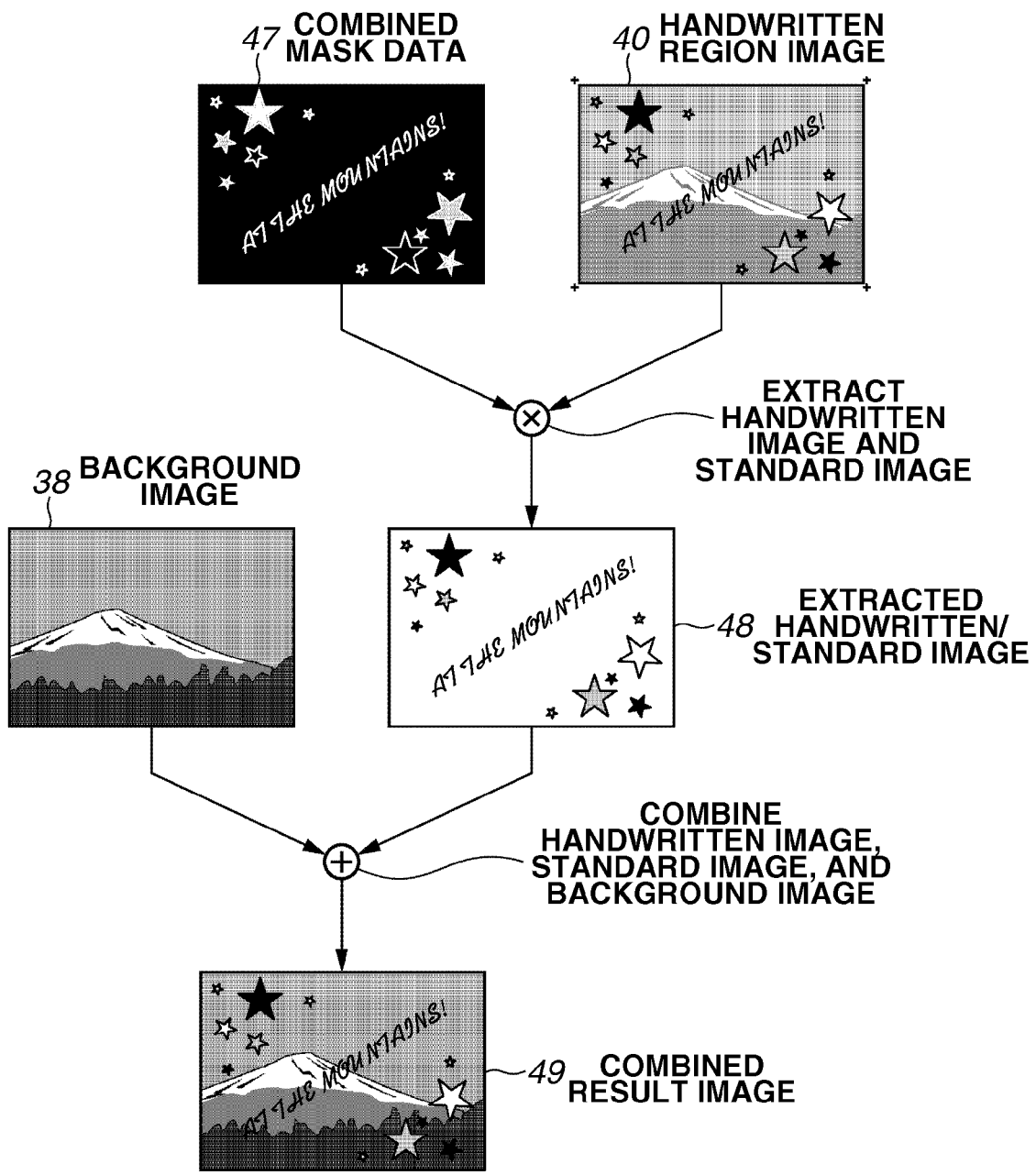
FIG. 16 illustrates a process of extracting the image from the handwritten region image using the combined mask data and combining the extracted image with the background image.

FIG. 16 illustrates a process of extracting the handwritten/standard image from the handwritten region image using the combined mask data (i.e., the process of step S110 illustrated in FIG. 7) and combining the extracted image with the background image (i.e., the process of step S11 illustrated in FIG. 7).

The CPU 2 extracts the handwritten/standard image from the handwritten region image using the combined mask data 47. More specifically, if the value of the pixel in the combined mask data 47 at the same position as the focused pixel in the handwritten region image 40 is 1, the pixel information of the handwritten region image 40 is adopted as the value of the pixel. On the other hand, if the value of the pixel in the combination mask data 47 at the same position as the focused pixel in the handwritten region image 40 is 0, the transmission information is adopted as the value of the pixel. As a result, an extracted handwritten/standard image 48 can be acquired from the handwritten region image 40. The CPU 2 then combines the extracted handwritten/standard image 48 with the background image 38 and generates a combined result image 49.

The process illustrated in FIG. 16 uses the combined mask data 47 in which the handwritten image mask data 42 and the standard image mask data 45 are combined. However, each mask data can be used to extract the extracted handwritten/standard image 48.

Furthermore, the extracted handwritten/standard image 48 is combined with the background image in the process illustrated in FIG. 16. More specifically, the image extraction process based on the mask data is separately performed from the process of combining the extracted image and the background image. However, when extracting the image based on the mask data, the extracted image can be written in the background image with which the extracted image is combined, without forming the extracted image as the image data. In such a case, if the value of the focused pixel is 1 when extracting the image from the handwritten region image 40 using the combined mask data 47, the pixel in the handwritten region image 40 corresponding to the focused pixel in the combined mask data 47 is adopted. On the other hand, if the value of the focused pixel in the combined mask data 47 is 0, the pixel in the background image 38 corresponding to the focused pixel is adopted. The combine result image 49 can thus be generated by such a process.

According to the above-described exemplary embodiment, color adjustment is performed on a region of the portion having the predetermined luminance value which is easily affected by the background color of the printing paper. As a result, the color tone of the standard image in the combined result becomes similar to the color tone of the original standard image data.

In the above-described process, color adjustment is performed on the handwritten region image. However, the present invention is not limited to the above-described process, and color adjustment can be performed when extracting the extracted handwritten/standard image 48 using the combined mask data 47. In such a case, the color adjustment region of the standard image mask data 45, which is only treated as the extraction region according to the process illustrated in FIG. 15, becomes the extraction region to be extracted from the handwritten region image and the color adjustment region.

The process of generating the combined mask data in the above-described case will be described below. When the information about the pixel in the standard image mask data is 2 (the color adjustment region and extracting region) and the information about the pixel in the same position in the handwritten image mask data is 0 (the non-extracting region), the information corresponding to the pixel at that position becomes 2. On the other hand, if the information about the pixel at the same position in the handwritten image mask data is 1 (extracting region), the user may have written on the standard image. In such a case, the information corresponding to the pixel at that position is set to 1 and is not color-adjusted. The combined mask data 47 is thus generated.

A second exemplary embodiment of the present invention describes a case where the user sets the layout of the combined result image before printing the handwritten document sheet.

Figure 17:
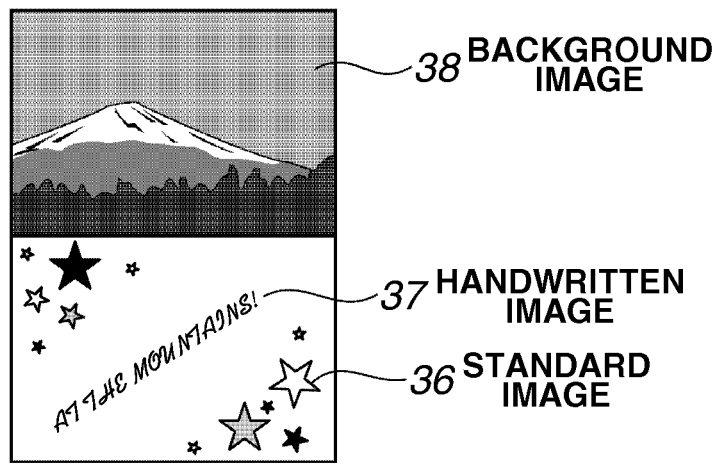
FIG. 17 illustrates an example of a combined image in a half-page layout.

FIG. 17 illustrates an example of the combined result image in the half-page layout. In the example, the standard image 36 is combined without being superposed on the background image 38, and printed. Similarly, the standard image 36 is combined with the background image without being superposed in the handwritten document sheet. In such a case, color adjustment can be performed as described in the first exemplary embodiment to eliminate the effect of the background color of the handwritten document sheet. However, if the printing paper is white, a method for extracting no white color portion when extracting the standard image from the handwritten document sheet can be employed.

Figure 18:
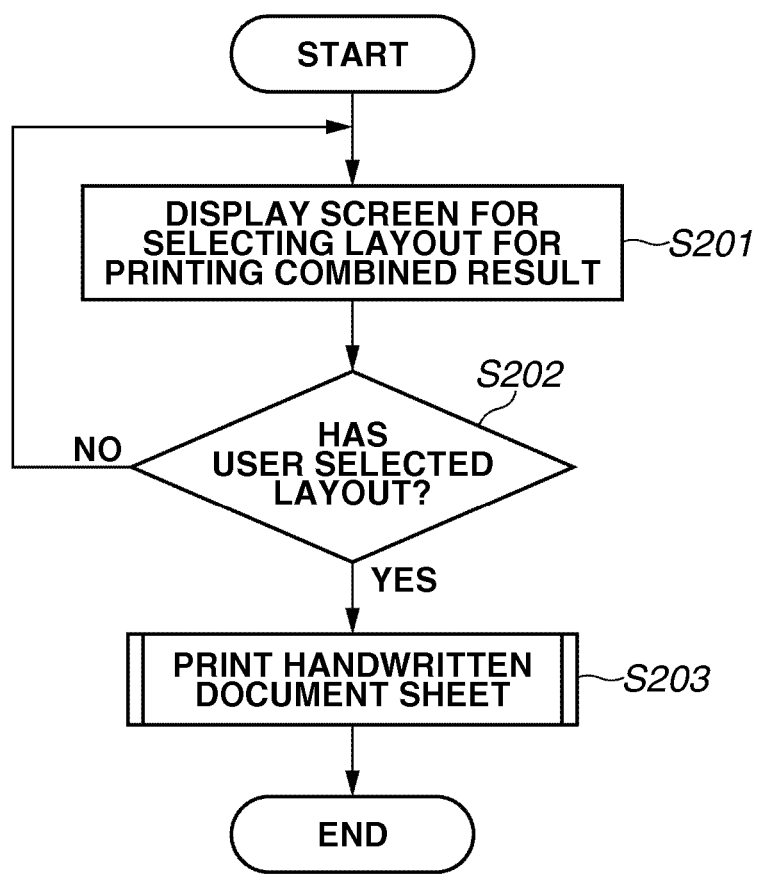
FIG. 18 is a flowchart illustrating a process of printing the handwritten document sheet according to a second exemplary embodiment of the present invention.

FIG. 18 is a flowchart illustrating a process of printing the handwritten document sheet in the second exemplary embodiment. The process is performed by the CPU 2 when the user selects "print handwritten document sheet" from the menu displayed on the operation panel 16.

In step S201, the CPU 2 displays the layout selection screen on the display unit 14. In step S202, the CPU 2 monitors the key operation of the operation unit 105 and determines whether the user selected the layout of the combined result. If the user has not selected the layout of the combined result (NO in step S202), the process returns to S201. On the other hand, if the user has selected the layout of the combined result (YES in step S201), the process proceeds to step S203.

In step S203, the CPU 2 prints the handwritten document sheet according to the flowchart described in FIG. 2. More specifically, the CPU 2 generates and thus prints the print data of either the handwritten document sheet for the full-page layout or the half-page layout depending on the layout of the combined result selected by the user in step S202.

Figure 19:
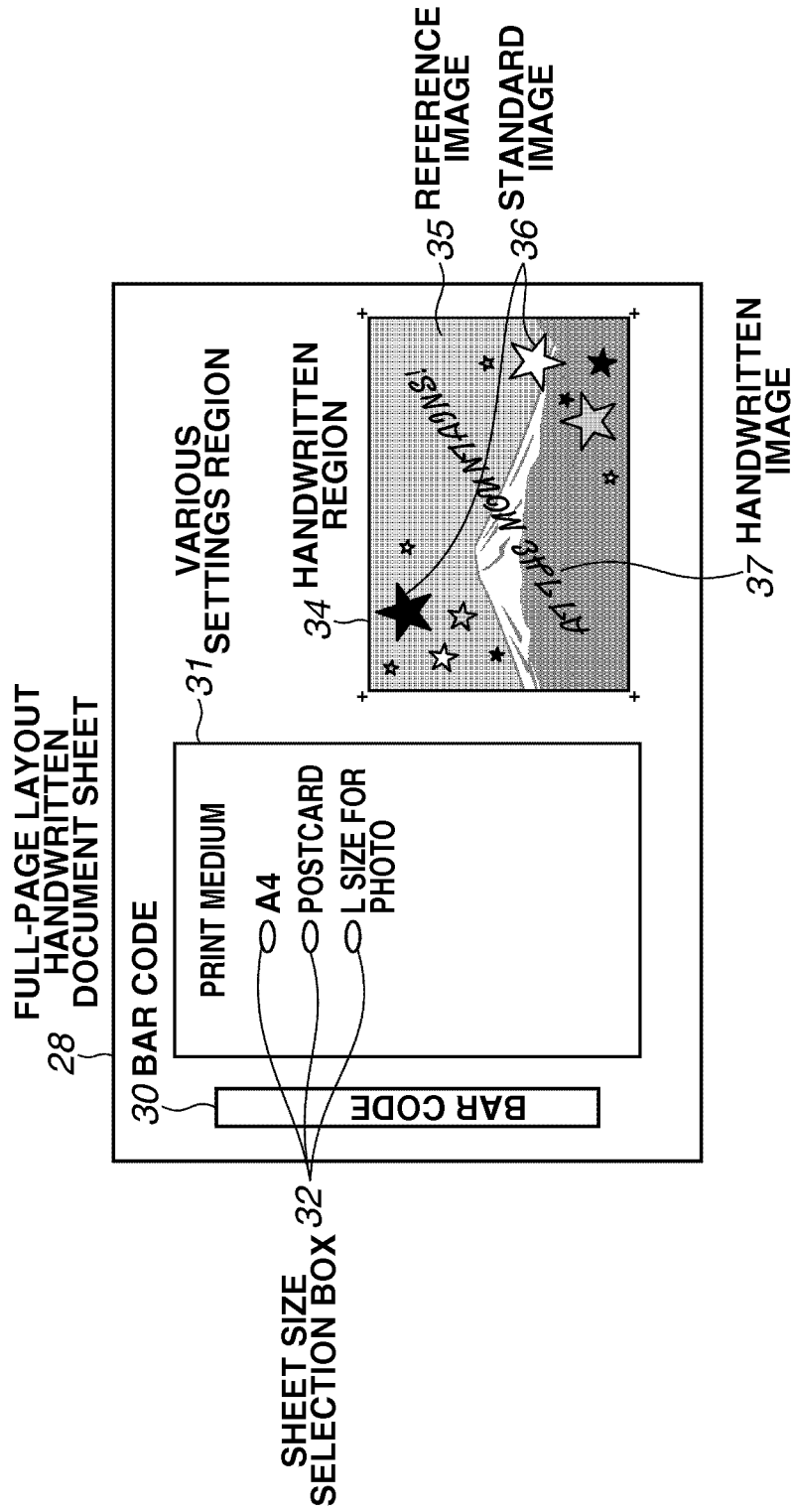
FIG. 19 illustrates a configuration of the handwritten document sheet for a full-page layout.
Figure 20:
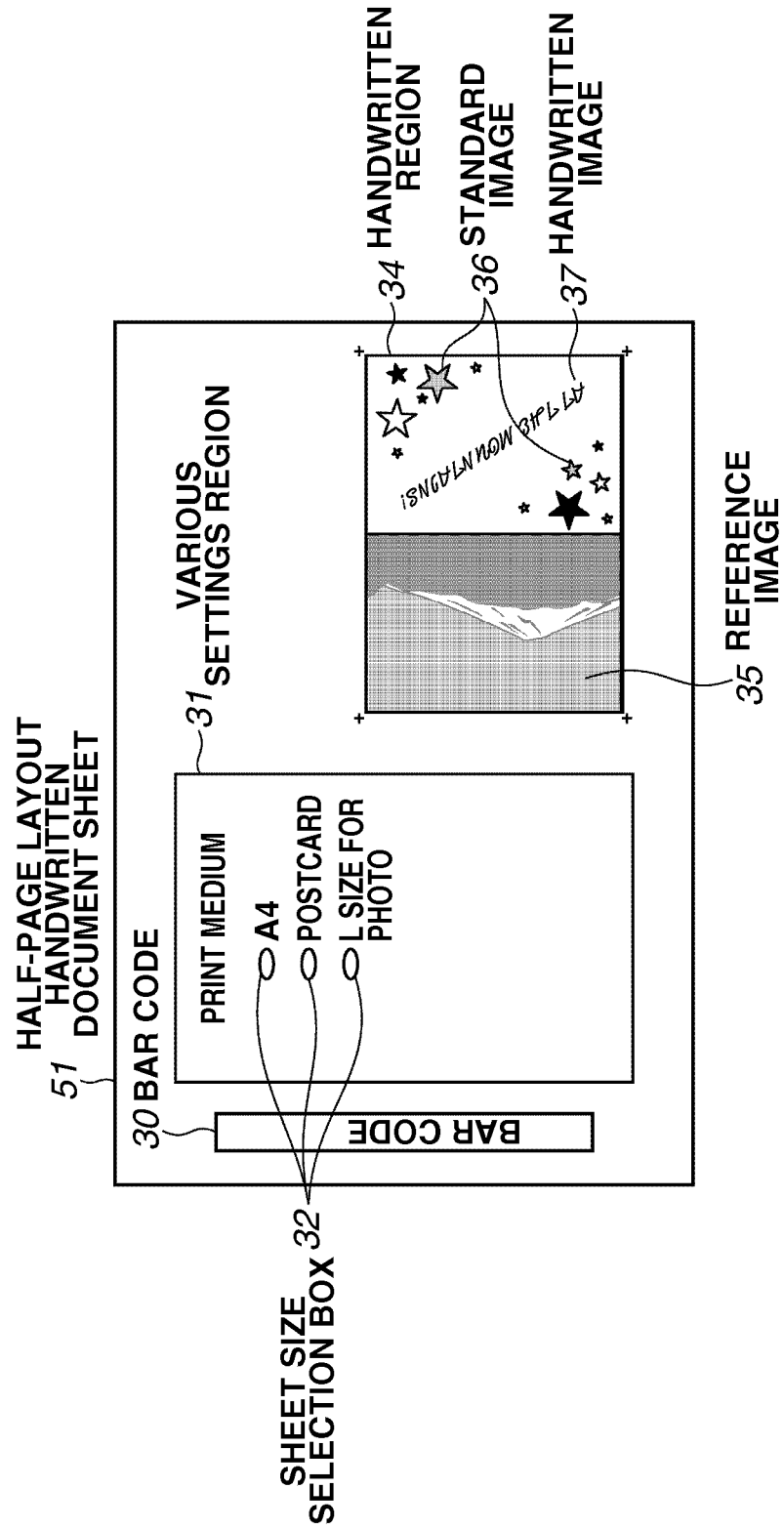
FIG. 20 illustrates a configuration of the handwritten document sheet for a half-page layout.

FIG. 19 illustrates the configuration of the handwritten document sheet for the full-page layout, and FIG. 20 illustrates the configuration of the handwritten document sheet for the half-page layout according to the present exemplary embodiment.

Referring to FIGS. 19 and 20, a handwritten document sheet for the full-page layout 28 and a handwritten document sheet for the half-page layout 51 both include the bar code 30. The bar code 30 records the information about the recording destination of the background image 38, the type of the standard image 36, and the information about the layout of the combined result selected by the user.

Further, the user selects the paper size of the recording medium on which the combined result image illustrated in FIG. 17 will be printed by filling in either of the sheet size selection boxes 32 within the setting region 31. Furthermore, there is no layout selection column as compared to the handwritten document sheet illustrated in FIG. 6.

In the handwritten document sheet for the half-page layout 51 illustrated in FIG. 20, the characters and the pictures written by the user are not superposed on the reference image. In such a case, the background image can be printed instead of the reference image.

Figure 21:
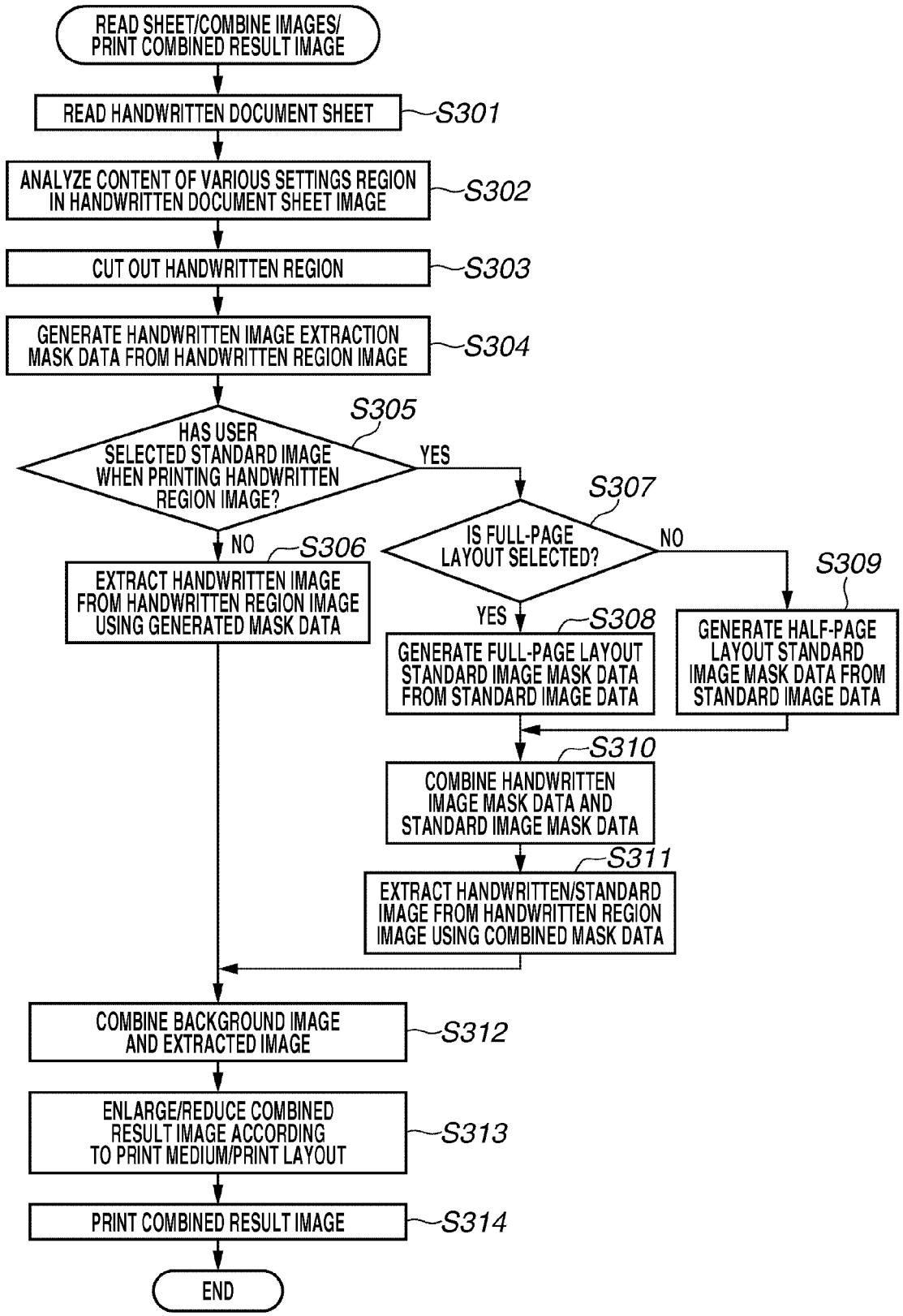
FIG. 21 is a flowchart illustrating a process of reading the handwritten document sheet filled in by the user and printing the combined result image.

FIG. 21 is a flowchart illustrating the process of reading the handwritten document sheet which the user has filled in and printing the combined result image. The process is executed by the CPU 2 when the user selects "read handwritten document sheet/print combined result" from the menu displayed on the operation panel 16.

The processes performed in step S301 to step S306 are similar to the processes performed in step S101 to step S106 illustrated in FIG. 7, and detailed description will be omitted.

A process of step S307 is performed when the user selects the standard image (YES in step S305). In step S307, the CPU 2 determines whether the user has selected the full-page layout when printing the handwritten document sheet, based on the information acquired by analyzing the bar code 30 in step S302.

If the user selected the full-page layout (YES in step S307), the process proceeds to step S308. In step S308, the CPU 2 generates full-page layout standard image mask data 52 based on the digital data of the standard image selected by the user. The method for generating the full-page layout standard image mask data 52 will be described below with reference to FIG. 22.

On the other hand, if the user has selected the half-page layout (NO in step S307), the process proceeds to step S309. In step S309, the CPU 2 generates half-page layout standard image mask data 53 based on the digital data of the standard image selected by the user. The method for generating the full-page layout standard image mask data 53 will be described below with reference to FIG. 23.

In step S310, the user combines the full-page standard image mask data 52 or the half-page layout standard image mask data 53 with the generated handwritten image mask data similarly as in the method described with reference to FIG. 15. In step S311, the CPU 2 extracts the image from the handwritten region image based on the combined mask data and acquires the extracted handwritten/standard image, similarly as in the method described with reference to FIG. 16. In step S312, the CPU 2 reads out the background image selected by the user from the memory card 18, combines the read background image with the image extracted in step S306 or step S311, and acquires the combined result image. The two images are combined by superposing the extracted image on the background image as illustrated in FIG. 8. In step S313, the CPU 2 enlarges or reduces and rotates the combined result image based on the paper size selection information acquired in step S302. In step S314, the CPU 2 prints the combined result image on the printing paper by controlling the printing mechanism 12.

Figure 22:
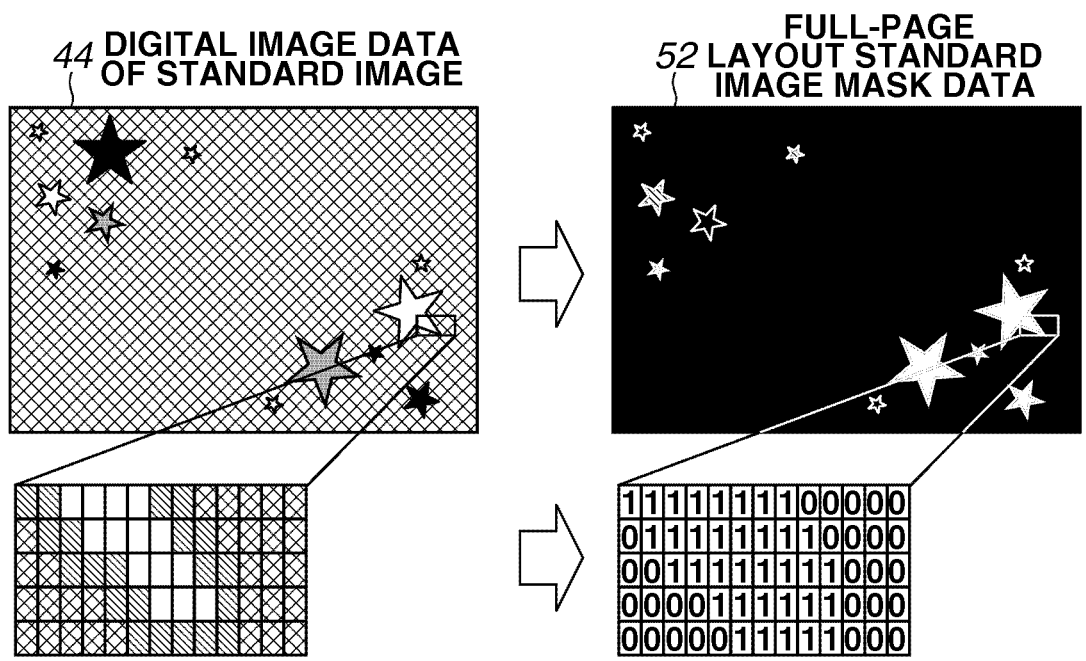
FIG. 22 illustrates a process of generating the standard image mask data for the full-page layout from the digital image data of the standard image.

FIG. 22 illustrates a process of generating the full-page layout standard image mask data 52 from the digital image data of the standard image (i.e., the process of step S308 in FIG. 21).

Referring to FIG. 22, the CPU 2 checks whether each pixel in the standard image digital image data 44 recorded in the program memory 4 is the transmission information. More specifically, the CPU 2 checks whether the luminance data of each pixel is of a predetermined value corresponding to the transmission information. If the focused pixel is the transmission information, the information corresponding to the focused pixel in the full-page layout standard image mask data 52 is set to 0, i.e., the non-extraction region. If the focused pixel is not the transmission information, the information corresponding to the focused pixel in the full-page layout standard image mask data 52 is set to 1, i.e., the extraction region.

Figure 23:
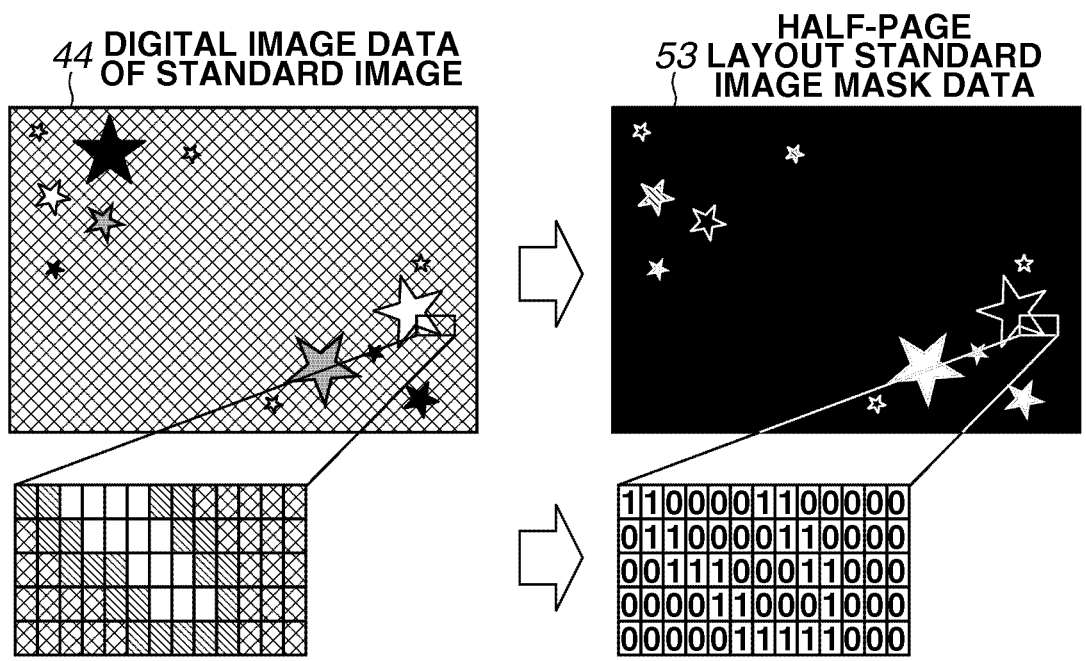
FIG. 23 illustrates a process of generating the standard image mask data for the half-page layout from the digital image data of the standard image.

FIG. 23 illustrates a process of generating the half-page layout standard image mask data 53 from the digital image data of the standard image (i.e., the process of step S309 in FIG. 21).

Referring to FIG. 23, the CPU 2 checks whether each pixel in the standard image digital image data 44 recorded in the program memory 4 is the transmission information. More specifically, the CPU 2 checks whether the luminance data of each pixel is of a predetermined value corresponding to the transmission information. If the focused pixel is the transmission information, the focused pixel in the half-page layout standard image mask data 53 is set to 0, i.e., the non-extraction region.

The CPU 2 then checks whether each pixel in the standard image digital image data 44 recorded in the program memory 4 is the color adjustment target information. More specifically, the CPU 2 checks whether the luminance data of each pixel is of a predetermined value corresponding to the color adjustment target. If the focused pixel is neither the transmission information nor the color adjustment target information, the information corresponding to the focused pixel in the half-page layout standard image mask data 53 is set to 1, i.e., the extraction region. On the other hand, if the focused pixel is the color adjustment target information, the information corresponding to the focused pixel in the half-page layout standard image mask data 53 is set to 0, i.e., the non-extraction region, similarly as in the case of the transmission information.

The predetermined value corresponding to the color adjustment target is determined by the objective of the color adjustment. For example, if the white color region is to be color adjusted to remove the background color, the predetermined value is set to R, G, and B (255, 255, and 255). A plurality of values can also be specified to the predetermined value corresponding to the color adjustment target to perform color adjustment on a color region of a certain range.

As to the half-page standard image mask data 53 illustrated in FIG. 23, the color region in the standard image data which is to be color-adjusted is not extracted. Therefore, if the color of the portion which was originally white is affected by the background color of the paper as a result of printing the standard image data on the handwritten document sheet, the pixel in the portion becomes equivalent to the transmission information and is not extracted.

The image extracted from the half-page standard image mask data 53 becomes the standard image 36 illustrated in FIG. 17 and is thus combined with the handwritten image 37. Since the color adjustment target region (white color region in the example) is not included, the standard image 36 illustrated in FIG. 17 is different from the original standard image data. As a result, the white color region missing in the standard image 36 is not printed, so that the background color of the handwritten document sheet and the error generated by the color characteristic when reading or inputting the handwritten document sheet can be prevented from affecting the image.

As described above, according to the present exemplary embodiment, the method for generating the standard image mask data can be switched according to whether the photo image and the standard image are overlapped when combining the images. Accordingly, if the photo image and the standard image are not overlapped and combined, the effect of the background color of the document sheet can be eliminated. The color of the standard image in the read image can be prevented from becoming different from the original color due to the color characteristic of the printing process and the reading process.

In the present exemplary embodiment, the full-page layout standard image mask data 52 and the half-page layout standard image mask data 53 are generated from the digital image data 44 of the standard image. However, the full-page layout standard image mask data 52 and the half-page layout standard image mask data 53 corresponding to the standard image can be previously stored in the program memory 4 and be used. It then becomes unnecessary to generate the full-page layout standard image mask data 52 and the half-page layout standard image mask data 53 from the digital image data of the standard image (i.e., perform the processes of step S308 and step S309).

Further, in the present exemplary embodiment, the process of extracting the image based on the mask data is described separately from the process of combining the extracted image and the background image. However, when the image is extracted based on the mask data, the extracted image can be written in the background image to be combined instead of forming the image data of the extracted image.

Furthermore, in the above-described exemplary embodiment, the format of the standard image mask data is not defined. For example, a plurality of values corresponding to the transmission information can be set to express the degree of transparency, or a plurality of values corresponding to the color adjustment target information can be set to express the information on the color adjustment method.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-205615 filed Aug. 8, 2008, which is hereby incorporated by reference herein in its entirety.

What is claimed is:

1. An apparatus comprising: at least one processor to function as:
   an inputting unit configured to input a read image obtained by reading, by a reading apparatus, a sheet on which an object is printed by a printing apparatus and information is added by a user;
   an extraction unit configured to extract the information and the object which are to be combined with an original image, from the read image, by specifying the object to be combined from the read image based on comparison between the read image and the object stored in a memory;
   a specifying unit configure to specify a part, to be edited, of the object extracted by the extraction unit, by comparing the read image and the object stored in the memory;
   an editing unit configured to edit the part of the object specified by the specifying unit; and
   a combining unit configured to combine the information and the object on the original image, the information and object being extracted from the read image by the extraction unit and the part of the object being edited by the editing unit.

2. The apparatus according to claim 1, wherein the editing unit replaces a color of the part of the object specified in the read image by the specifying unit by a color corresponding to the part of the object stored in the memory.

3. The apparatus according to claim 2, wherein the specifying unit specifies a part of the object corresponding to a white color, and the editing unit replaces a color of the part of the object in the read image by a predetermined white color.

4. The apparatus according to claim 1, further comprising a generating unit configured to generate specifying information for specifying the object and the part of the object to be edited,
wherein the specifying unit specifies the part by comparing the read image and the specifying information generated by the generating unit, and the extraction unit extracts the object from the read image, by specifying the object based on comparison between the read image and the specifying information generated by the generating unit.

5. The apparatus according to claim 1, further comprising an outputting unit to output a combined image obtained by the combining by the combining unit.

6. The apparatus according to claim 1, further comprising a print control unit configured to cause the printing apparatus to print the original image and the object, on the sheet.

7. The apparatus according to claim 6, further comprising a conversion unit configured to convert the original image to a reference image having a higher luminance than the original image;
wherein the print control unit causes the printing apparatus to print the reference image converted by the conversion unit, on the sheet.

8. The apparatus according to claim 1, wherein the extraction unit extracts an area in the read image corresponding to a luminance lower than a predetermined luminance, as the information.

9. The apparatus according to claim 1, wherein the extraction unit extracts the object and the information, as an image including both of the object and the information.

10. The apparatus according to claim 1, wherein the apparatus includes the printing apparatus and the reading apparatus.

11. A method performed by at least one processor, the comprising:
inputting a read image obtained by reading, by a reading apparatus, a sheet on which an object is printed by a printing apparatus and information is added by a user;
extracting the information and the object which are to be combined with an original image, from the read image, by specifying the object to be combined from the read image based on comparison between the read image and the object stored in a memory;
specifying a part, to be edited, of the object extracted from the read image, by comparing the read image and the object stored in the memory;
editing the specified part of the object; and
combining the information and the object on the original image, the information and the object being extracted from the read image and the part of the object being edited.

12. The method according to claim 11, wherein editing the specified part comprising replacing a color of the part of the object specified in the read image by a color corresponding to the part of the object stored in the memory.

13. The method according to claim 12, wherein specifying the part of the object to be edited comprises specifying a part of the object corresponding to a white color, and editing the specified part comprises replacing a color of the part of the object in the read image by a predetermined white color.

14. The method according to claim 11, further comprising generating specifying information for specifying the object and the part of the object to be edited,
wherein the part is specified by comparing the read image and the generated specifying information, and extracting the object from the read image, by specifying the object based on comparison between the read image and the generated specifying information.

15. The method according to claim 11, further comprising outputting a combined image obtained by the combining.

16. The method according to claim 15, further comprising performing first print control that comprises causing the printing apparatus to print the original image and the object, on the sheet.

17. The method according to claim 16, further comprising converting the original image to a reference image having a higher luminance than the original image,
wherein performing the first print control causes the printing apparatus to print the reference image converted by the conversion unit, on the sheet.

18. The method according to claim 11, wherein the extracting the information and the object comprises extracting an area in the read image corresponding to a luminance lower than a predetermined luminance, as the information.

19. The method according to claim 11, wherein extracting the information and the object comprises extracting the object and the information, as an image including both of the object and the information.

20. A non-transitory computer readable storage medium comprising computer-executable instructions stored thereon for performing a method comprising:
inputting a read image obtained by reading, by a reading apparatus, a sheet on which an object is printed by a printing apparatus and information is added by a user;
extracting the information and the object which are to be combined with an original image, from the read image, by specifying the object to be combined from the read image based on comparison between the read image and the object stored in a memory;
specifying a part, to be edited, of the object extracted from the read image, by comparing the read image and the object stored in the memory;
editing the specified part of the object; and
combining the information and the object on the original image, the information and the object being extracted from the read image and the part of the object being edited.

* * * * *